United States Patent
Ravi et al.

(10) Patent No.: US 8,741,818 B2
(45) Date of Patent: Jun. 3, 2014

(54) LOST CIRCULATION COMPOSITIONS AND ASSOCIATED METHODS

(75) Inventors: Krishna Ravi, Kingwood, TX (US); Rahul Chandrakant Patil, Maharashtra (IN); Sandip Prabhakar Patil, Maharashtra (IN); Sairam K S Pindiprolu, Maharashtra (IN); Craig W. Roddy, Duncan, OK (US); Ricky Covington, Frisco, TX (US); Jiten Chatterji, Duncan, OK (US); D. Chad Brenneis, Marlow, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/443,934

(22) Filed: Apr. 11, 2012

(65) Prior Publication Data

US 2012/0192768 A1    Aug. 2, 2012

Related U.S. Application Data

(60) Division of application No. 13/052,471, filed on Mar. 21, 2011, now Pat. No. 8,685,903, which is a continuation-in-part of application No. 12/567,782, filed on Sep. 27, 2009, now Pat. No. 8,586,512, which is a continuation-in-part of application No. 12/263,954, filed on Nov. 3, 2008, which is a continuation-in-part of application No. 11/747,002, filed on May 10, 2007, now Pat. No. 7,559,369.

(51) Int. Cl.
*C09K 8/48*  (2006.01)
*E21B 33/13*  (2006.01)

(52) U.S. Cl.
USPC ........... 507/269; 507/219; 507/271; 166/285; 166/293; 166/295; 106/812

(58) Field of Classification Search
None
See application file for complete search history.

(56) References Cited

U.S. PATENT DOCUMENTS

| 2,094,316 A | 9/1937 | Cross et al. |
| 2,329,940 A | 9/1943 | Ponzer |
| 2,842,205 A | 7/1958 | Allen et al. |
| 2,848,051 A | 8/1958 | Willaims |

(Continued)

FOREIGN PATENT DOCUMENTS

| CA | 2514492 | 9/2004 | |
| CA | 2153372 A1 | 1/2006 | ............. C04B 18/12 |

(Continued)

OTHER PUBLICATIONS

Bartlet-Gouedard, "A Non-Conventional Way of Developing Cement Slurry for Geothermal Wells", 2001.

(Continued)

*Primary Examiner* — John J Figueroa
(74) *Attorney, Agent, or Firm* — Craig W. Roddy; Tumey L.L.P.

(57) ABSTRACT

An embodiment includes a method of servicing a well bore. The method may comprise introducing a lost circulation composition into a lost circulation zone, the lost circulation composition comprising hydraulic cement, nano-particles, amorphous silica, clay, and water. The method further may comprise allowing the lost circulation composition to set in the lost circulation zone. Another embodiment includes a lost circulation composition. The lost circulation may comprise hydraulic cement, nano-particles, amorphous silica, clay, and water.

27 Claims, 5 Drawing Sheets

(56) References Cited

U.S. PATENT DOCUMENTS

| | | | |
|---|---|---|---|
| 2,857,286 A | 10/1958 | Striker | |
| 2,871,133 A | 1/1959 | Palonen et al. | |
| 2,880,096 A | 3/1959 | Hurley | |
| 2,890,169 A | 6/1959 | Prokop | |
| 2,933,135 A | 4/1960 | Johnson | |
| 2,945,769 A | 7/1960 | Gama et al. | |
| 2,952,318 A | 9/1960 | Ritch | |
| 2,959,223 A | 11/1960 | Harmon et al. | |
| 2,978,024 A | 4/1961 | Davis | |
| 3,026,938 A | 3/1962 | Huitt et al. | |
| 3,079,268 A | 2/1963 | Brooks | |
| 3,168,139 A | 2/1965 | Kennedy et al. | |
| 3,219,112 A | 11/1965 | Sauber et al. | |
| 3,336,979 A | 8/1967 | Ingraham et al. | |
| 3,353,601 A | 11/1967 | Dollarhide et al. | |
| 3,366,177 A | 1/1968 | Powers et al. | |
| 3,381,748 A | 5/1968 | Peters et al. | |
| 3,454,095 A | 7/1969 | Messenger et al. | |
| 3,467,193 A | 9/1969 | Messenger | |
| 3,499,491 A | 3/1970 | Wyant et al. | |
| 3,557,876 A | 1/1971 | Tragesser | |
| 3,607,326 A | 9/1971 | Serafin | |
| RE27,271 E | 1/1972 | Hamsberger et al. | |
| 3,748,159 A | 7/1973 | George | |
| 3,854,985 A | 12/1974 | Suzuki et al. | |
| 3,876,005 A | 4/1975 | Fincher et al. | |
| 3,877,522 A | 4/1975 | Knight et al. | |
| 3,887,009 A | 6/1975 | Miller et al. | |
| 3,887,385 A | 6/1975 | Quist et al. | |
| 3,888,311 A | 6/1975 | Cooke, Jr. | |
| 3,958,638 A | 5/1976 | Johnston | |
| 3,959,007 A * | 5/1976 | Pitt | 106/406 |
| 4,018,617 A | 4/1977 | Nicholson | |
| 4,031,184 A | 6/1977 | McCord | |
| 4,036,301 A | 7/1977 | Powers et al. | |
| 4,105,459 A * | 8/1978 | Mehta | 106/737 |
| 4,142,910 A | 3/1979 | Kraemer et al. | |
| 4,176,720 A | 12/1979 | Wilson | |
| 4,202,413 A | 5/1980 | Messenger | |
| 4,202,795 A | 5/1980 | Burnham et al. | |
| 4,235,291 A | 11/1980 | Messenger | |
| 4,268,316 A | 5/1981 | Wills et al. | |
| 4,274,881 A | 6/1981 | Langton et al. | |
| 4,284,433 A | 8/1981 | Aignesberger et al. | |
| 4,297,309 A * | 10/1981 | North | 264/667 |
| 4,341,562 A | 7/1982 | Ahlbeck | |
| 4,353,746 A | 10/1982 | Birchall et al. | |
| RE31,190 E | 3/1983 | Detroit et al. | |
| 4,400,474 A | 8/1983 | Copperthwaite et al. | |
| 4,407,677 A | 10/1983 | Wills et al. | |
| 4,432,800 A | 2/1984 | Kneller et al. | |
| 4,435,216 A | 3/1984 | Diehl et al. | |
| 4,460,292 A | 7/1984 | Durham et al. | |
| 4,494,990 A | 1/1985 | Harris | |
| 4,506,734 A | 3/1985 | Nolte | |
| 4,515,216 A | 5/1985 | Childs et al. | |
| 4,515,635 A | 5/1985 | Rao et al. | |
| 4,519,452 A | 5/1985 | Tsao et al. | |
| 4,555,269 A | 11/1985 | Rao et al. | |
| 4,614,599 A | 9/1986 | Walker | |
| 4,624,711 A | 11/1986 | Styron | |
| 4,633,950 A | 1/1987 | Delhommer et al. | |
| 4,642,137 A * | 2/1987 | Heitzmann et al. | 106/607 |
| 4,643,362 A | 2/1987 | Serafin | |
| 4,650,520 A * | 3/1987 | Johnsen et al. | 106/639 |
| 4,660,642 A | 4/1987 | Young | |
| 4,676,317 A | 6/1987 | Fry et al. | |
| 4,676,832 A | 6/1987 | Childs et al. | |
| 4,700,777 A | 10/1987 | Luers | |
| 4,711,401 A | 12/1987 | Serafin | |
| 4,721,160 A | 1/1988 | Parcevaux et al. | |
| 4,741,401 A | 5/1988 | Walles et al. | |
| 4,741,782 A | 5/1988 | Styron | |
| 4,770,796 A | 9/1988 | Jacobs | |
| 4,784,223 A | 11/1988 | Worrall et al. | |
| 4,822,421 A | 4/1989 | Crabb | |
| 4,848,973 A | 7/1989 | Yokota et al. | |
| 4,883,125 A | 11/1989 | Wilson et al. | |
| 4,941,536 A | 7/1990 | Brothers et al. | |
| 4,953,620 A | 9/1990 | Bloys et al. | |
| 4,961,790 A | 10/1990 | Smith et al. | |
| 4,992,102 A | 2/1991 | Barbour | |
| 5,030,366 A | 7/1991 | Wilson et al. | |
| 5,049,288 A | 9/1991 | Brothers et al. | |
| 5,058,679 A | 10/1991 | Hale et al. | |
| RE33,747 E | 11/1991 | Hartley et al. | |
| 5,086,850 A | 2/1992 | Harris et al. | |
| 5,102,558 A | 4/1992 | McDougall et al. | |
| 5,121,795 A * | 6/1992 | Ewert et al. | 166/292 |
| 5,123,487 A * | 6/1992 | Harris et al. | 166/277 |
| 5,125,455 A | 6/1992 | Harris et al. | |
| 5,127,473 A * | 7/1992 | Harris et al. | 166/277 |
| 5,149,370 A * | 9/1992 | Olaussen et al. | 166/292 |
| 5,151,203 A | 9/1992 | Riley et al. | |
| 5,183,505 A | 2/1993 | Spinney | |
| 5,203,629 A | 4/1993 | Valle et al. | |
| 5,207,832 A | 5/1993 | Baffreau et al. | |
| 5,213,160 A | 5/1993 | Nahm et al. | |
| 5,236,501 A | 8/1993 | Nomachi et al. | |
| 5,238,064 A * | 8/1993 | Dahl et al. | 166/293 |
| 5,253,991 A | 10/1993 | Yokota et al. | |
| 5,263,542 A * | 11/1993 | Brothers | 166/293 |
| 5,266,111 A | 11/1993 | Barbour | |
| 5,292,512 A | 3/1994 | Schaefer et al. | |
| 5,295,543 A | 3/1994 | Terry et al. | |
| 5,305,831 A | 4/1994 | Nahm | |
| 5,314,022 A | 5/1994 | Cowan et al. | |
| 5,320,851 A | 6/1994 | Mars et al. | |
| 5,327,968 A | 7/1994 | Onan et al. | |
| 5,337,824 A | 8/1994 | Cowan | |
| 5,339,903 A | 8/1994 | Eoff et al. | |
| 5,340,397 A * | 8/1994 | Brothers | 106/727 |
| 5,346,012 A * | 9/1994 | Heathman et al. | 166/293 |
| 5,352,288 A | 10/1994 | Mallow | |
| 5,358,044 A | 10/1994 | Hale et al. | |
| 5,358,047 A | 10/1994 | Himes et al. | |
| 5,358,049 A | 10/1994 | Hale et al. | |
| 5,361,841 A | 11/1994 | Hale et al. | |
| 5,361,842 A | 11/1994 | Hale et al. | |
| 5,368,103 A | 11/1994 | Heathman et al. | |
| 5,370,185 A | 12/1994 | Cowan et al. | |
| 5,372,641 A | 12/1994 | Carpenter | |
| 5,373,901 A | 12/1994 | Norman et al. | |
| 5,375,661 A * | 12/1994 | Daneshy et al. | 166/278 |
| 5,382,290 A | 1/1995 | Nahm et al. | |
| 5,383,521 A | 1/1995 | Onan et al. | |
| 5,383,967 A | 1/1995 | Chase | |
| 5,389,706 A * | 2/1995 | Heathman et al. | 166/293 |
| 5,398,758 A | 3/1995 | Onan et al. | |
| 5,398,759 A * | 3/1995 | Rodrigues et al. | 166/293 |
| 5,423,379 A | 6/1995 | Hale et al. | |
| 5,439,056 A | 8/1995 | Cowan | |
| 5,454,867 A | 10/1995 | Brothers et al. | |
| 5,456,750 A | 10/1995 | Zandi et al. | |
| 5,458,195 A | 10/1995 | Totten et al. | |
| 5,464,060 A | 11/1995 | Hale et al. | |
| 5,472,051 A | 12/1995 | Brothers | |
| 5,476,142 A | 12/1995 | Kajita | |
| 5,476,144 A | 12/1995 | Nahm et al. | |
| 5,484,480 A | 1/1996 | Styron | |
| 5,494,513 A | 2/1996 | Fu et al. | |
| 5,499,677 A | 3/1996 | Cowan | |
| 5,509,962 A | 4/1996 | Tang | |
| 5,515,921 A | 5/1996 | Cowan et al. | |
| 5,518,996 A | 5/1996 | Maroy et al. | |
| 5,520,730 A | 5/1996 | Barbour | |
| 5,529,624 A | 6/1996 | Riegler | |
| 5,536,311 A | 7/1996 | Rodrigues | |
| 5,542,782 A | 8/1996 | Carter et al. | |
| 5,551,976 A | 9/1996 | Allen | |
| 5,569,324 A | 10/1996 | Totten et al. | |
| 5,575,841 A | 11/1996 | Dry | |
| 5,580,379 A | 12/1996 | Cowan | |
| 5,585,333 A | 12/1996 | Dahl et al. | |

(56) References Cited

U.S. PATENT DOCUMENTS

| | | | |
|---|---|---|---|
| 5,588,488 | A | 12/1996 | Vijn et al. |
| 5,588,489 | A | 12/1996 | Chatterji et al. |
| 5,603,961 | A | 2/1997 | Suzuki et al. |
| 5,660,624 | A | 8/1997 | Dry |
| 5,663,230 | A | 9/1997 | Haman |
| 5,673,753 | A | 10/1997 | Hale et al. |
| 5,688,844 | A | 11/1997 | Chatterji et al. |
| 5,693,137 | A | 12/1997 | Styron |
| 5,711,383 | A | 1/1998 | Terry et al. |
| 5,716,910 | A | 2/1998 | Totten et al. |
| 5,728,209 | A | 3/1998 | Bury et al. |
| 5,728,654 | A | 3/1998 | Dobson et al. |
| 5,741,357 | A | 4/1998 | Sheikh |
| 5,766,323 | A | 6/1998 | Butler et al. |
| 5,779,787 | A | 7/1998 | Brothers et al. |
| 5,783,541 | A | 7/1998 | Tack et al. |
| 5,788,762 | A * | 8/1998 | Barger et al. .............. 106/706 |
| 5,795,060 | A | 8/1998 | Stephens |
| 5,820,670 | A | 10/1998 | Chatterji et al. |
| 5,851,960 | A | 12/1998 | Totten et al. |
| 5,866,516 | A | 2/1999 | Costin |
| 5,874,387 | A | 2/1999 | Carpenter et al. |
| 5,879,699 | A | 3/1999 | Lerner |
| 5,897,699 | A | 4/1999 | Chatterji et al. |
| 5,900,053 | A | 5/1999 | Brothers et al. |
| 5,913,364 | A | 6/1999 | Sweatman |
| 5,988,279 | A | 11/1999 | Udarbe et al. |
| 5,989,334 | A | 11/1999 | Dry |
| 6,022,408 | A | 2/2000 | Stokes et al. |
| 6,027,561 | A | 2/2000 | Gruber et al. |
| 6,060,434 | A | 5/2000 | Sweatman et al. |
| 6,060,535 | A | 5/2000 | Villar et al. |
| 6,063,738 | A | 5/2000 | Chatterji et al. |
| 6,138,759 | A | 10/2000 | Chatterji et al. |
| 6,143,069 | A | 11/2000 | Brothers et al. |
| 6,145,591 | A | 11/2000 | Boncan et al. |
| 6,153,562 | A | 11/2000 | Villar et al. |
| 6,167,967 | B1 | 1/2001 | Sweatman |
| 6,170,575 | B1 | 1/2001 | Reddy et al. |
| 6,230,804 | B1 | 5/2001 | Mueller et al. |
| 6,244,343 | B1 | 6/2001 | Brothers et al. |
| 6,245,142 | B1 | 6/2001 | Reddy et al. |
| 6,258,757 | B1 | 7/2001 | Sweatman et al. |
| 6,261,360 | B1 | 7/2001 | Dry |
| 6,277,189 | B1 | 8/2001 | Chugh |
| 6,279,655 | B1 | 8/2001 | Pafitis et al. |
| 6,312,515 | B1 | 11/2001 | Barlet-Gouedard et al. |
| 6,315,042 | B1 | 11/2001 | Griffith et al. |
| 6,332,921 | B1 | 12/2001 | Brothers et al. |
| 6,367,550 | B1 | 4/2002 | Chatterji et al. |
| 6,379,456 | B1 | 4/2002 | Heathman et al. |
| 6,390,197 | B1 | 5/2002 | Marcoy |
| 6,402,833 | B1 | 6/2002 | O'Hearn et al. |
| 6,409,819 | B1 | 6/2002 | Ko |
| 6,444,316 | B1 | 9/2002 | Reddy et al. |
| 6,457,524 | B1 | 10/2002 | Roddy |
| 6,471,975 | B1 | 10/2002 | Banovetz et al. |
| 6,478,869 | B2 | 11/2002 | Reddy et al. |
| 6,488,089 | B1 | 12/2002 | Bour et al. |
| 6,488,763 | B2 | 12/2002 | Brothers et al. |
| 6,488,764 | B2 | 12/2002 | Westerman |
| 6,494,951 | B1 | 12/2002 | Reddy et al. |
| 6,500,252 | B1 | 12/2002 | Chatterji et al. |
| 6,500,253 | B2 | 12/2002 | Norman et al. |
| 6,502,636 | B2 | 1/2003 | Chatterji et al. |
| 6,508,305 | B1 | 1/2003 | Brannon et al. |
| 6,524,384 | B2 | 2/2003 | Griffith et al. |
| 6,527,051 | B1 | 3/2003 | Reddy et al. |
| 6,527,849 | B2 | 3/2003 | Dry |
| 6,547,871 | B2 | 4/2003 | Chatterji et al. |
| 6,547,891 | B2 | 4/2003 | Linden et al. |
| 6,554,067 | B1 | 4/2003 | Davies et al. |
| 6,554,071 | B1 | 4/2003 | Reddy et al. |
| 6,561,273 | B2 | 5/2003 | Brothers et al. |
| 6,562,122 | B2 | 5/2003 | Dao et al. |
| 6,565,647 | B1 | 5/2003 | Day et al. |
| 6,572,697 | B2 | 6/2003 | Gleeson et al. |
| 6,599,863 | B1 | 7/2003 | Palmer et al. |
| 6,610,139 | B2 | 8/2003 | Reddy et al. |
| 6,626,243 | B1 | 9/2003 | Go Boncan |
| 6,631,766 | B2 | 10/2003 | Brothers et al. |
| 6,632,527 | B1 | 10/2003 | McDaniel et al. |
| 6,645,288 | B1 | 11/2003 | Dargaud et al. |
| 6,645,290 | B1 | 11/2003 | Barbour |
| 6,648,962 | B2 | 11/2003 | Berke et al. |
| 6,656,265 | B1 | 12/2003 | Garnier et al. |
| 6,660,080 | B2 | 12/2003 | Reddy et al. |
| 6,666,268 | B2 | 12/2003 | Griffith et al. |
| 6,668,929 | B2 | 12/2003 | Griffith et al. |
| 6,689,208 | B1 | 2/2004 | Brothers |
| 6,702,044 | B2 | 3/2004 | Reddy et al. |
| 6,706,108 | B2 | 3/2004 | Polston |
| 6,716,282 | B2 | 4/2004 | Griffith et al. |
| 6,729,405 | B2 | 5/2004 | DiLullo et al. |
| 6,767,398 | B2 | 7/2004 | Trato |
| 6,776,237 | B2 | 8/2004 | Dao et al. |
| 6,796,378 | B2 | 9/2004 | Reddy et al. |
| 6,797,054 | B2 | 9/2004 | Chatterji et al. |
| 6,808,561 | B2 | 10/2004 | Genge |
| 6,811,603 | B2 | 11/2004 | Brothers et al. |
| 6,823,940 | B2 | 11/2004 | Reddy et al. |
| 6,832,651 | B2 | 12/2004 | Ravi et al. |
| 6,835,243 | B2 | 12/2004 | Brothers et al. |
| 6,837,316 | B2 | 1/2005 | Reddy et al. |
| 6,846,357 | B2 | 1/2005 | Reddy et al. |
| 6,848,519 | B2 | 2/2005 | Reddy et al. |
| 6,861,392 | B2 | 3/2005 | Shaarpour |
| 6,861,468 | B2 | 3/2005 | Yoshida et al. |
| 6,874,578 | B1 * | 4/2005 | Garnier et al. .............. 166/293 |
| 6,881,708 | B2 | 4/2005 | Reddy et al. |
| 6,883,609 | B2 * | 4/2005 | Drochon et al. .............. 166/292 |
| 6,887,833 | B2 | 5/2005 | Brothers et al. |
| 6,889,767 | B2 | 5/2005 | Reddy et al. |
| 6,902,001 | B2 | 6/2005 | Dargaud et al. |
| 6,904,971 | B2 | 6/2005 | Brothers et al. |
| 6,907,929 | B2 | 6/2005 | LeRoy-Delage et al. |
| 6,908,508 | B2 | 6/2005 | Brothers |
| 6,911,078 | B2 | 6/2005 | Barlet-Gouedard et al. |
| 6,926,081 | B2 | 8/2005 | Sweatman et al. |
| 6,962,201 | B2 | 11/2005 | Brothers |
| 7,007,755 | B2 | 3/2006 | Reddy et al. |
| 7,022,179 | B1 | 4/2006 | Dry |
| 7,026,272 | B2 | 4/2006 | Reddy et al. |
| 7,032,664 | B2 | 4/2006 | Lord et al. |
| 7,033,975 | B2 | 4/2006 | Baran et al. |
| 7,048,053 | B2 | 5/2006 | Santra et al. |
| 7,059,415 | B2 | 6/2006 | Bosma et al. |
| 7,077,203 | B1 | 7/2006 | Roddy et al. |
| 7,084,092 | B2 | 8/2006 | Patel et al. |
| 7,086,466 | B2 | 8/2006 | Roddy |
| 7,138,446 | B2 | 11/2006 | Reddy et al. |
| 7,143,828 | B2 | 12/2006 | Reddy et al. |
| 7,143,832 | B2 | 12/2006 | Freyer |
| 7,156,173 | B2 | 1/2007 | Mueller |
| 7,156,174 | B2 | 1/2007 | Roddy et al. |
| 7,172,022 | B2 | 2/2007 | Reddy et al. |
| 7,174,962 | B1 | 2/2007 | Roddy et al. |
| 7,182,137 | B2 | 2/2007 | Fyten et al. |
| 7,199,086 | B1 | 4/2007 | Roddy et al. |
| 7,204,307 | B2 | 4/2007 | Roddy et al. |
| 7,204,310 | B1 | 4/2007 | Roddy et al. |
| 7,204,312 | B2 | 4/2007 | Roddy et al. |
| 7,213,646 | B2 * | 5/2007 | Roddy et al. .............. 166/285 |
| 7,264,053 | B2 | 9/2007 | Vargo, Jr. et al. |
| 7,279,447 | B2 | 10/2007 | Lal et al. |
| 7,284,609 | B2 | 10/2007 | Roddy et al. |
| 7,284,611 | B2 | 10/2007 | Reddy et al. |
| 7,294,194 | B2 | 11/2007 | Reddy et al. |
| 7,296,597 | B1 | 11/2007 | Freyer et al. |
| 7,303,014 | B2 | 12/2007 | Reddy et al. |
| 7,335,252 | B2 | 2/2008 | Roddy et al. |
| 7,337,841 | B2 | 3/2008 | Ravi |
| 7,337,842 | B2 | 3/2008 | Roddy et al. |
| 7,338,923 | B2 | 3/2008 | Roddy et al. |

(56) References Cited

U.S. PATENT DOCUMENTS

| | | |
|---|---|---|
| 7,341,104 B2 | 3/2008 | Roddy et al. |
| 7,351,279 B2 | 4/2008 | Brothers |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,393,407 B2 | 7/2008 | Dingsoyr et al. |
| 7,395,860 B2 | 7/2008 | Roddy et al. |
| 7,404,440 B2 | 7/2008 | Reddy et al. |
| 7,409,991 B2 | 8/2008 | Reddy et al. |
| 7,422,060 B2 | 9/2008 | Hammami et al. |
| 7,424,913 B2 | 9/2008 | Roddy |
| 7,445,668 B2 | 11/2008 | Sommain |
| 7,445,669 B2 | 11/2008 | Roddy et al. |
| 7,451,817 B2 | 11/2008 | Reddy et al. |
| 7,461,696 B2 | 12/2008 | Nguyen et al. |
| 7,478,675 B2 | 1/2009 | Roddy et al. |
| 7,478,678 B2 | 1/2009 | Roddy et al. |
| 7,482,309 B2 | 1/2009 | Ravi et al. |
| 7,559,369 B2 | 7/2009 | Roddy |
| 7,776,797 B2 | 8/2010 | Allin et al. |
| 7,784,542 B2 | 8/2010 | Roddy |
| 7,806,183 B2 | 10/2010 | Roddy et al. |
| 7,846,876 B2 | 12/2010 | Koyanagi |
| 7,892,352 B2 | 2/2011 | Roddy et al. |
| 8,114,820 B2 | 2/2012 | Crews |
| 8,226,879 B2 | 7/2012 | Genolet et al. |
| 8,476,203 B2 | 7/2013 | Patil et al. |
| 8,499,837 B2 | 8/2013 | Koons |
| 8,586,512 B2 | 11/2013 | Roddy et al. |
| 8,598,093 B2 | 12/2013 | Roddy et al. |
| 8,603,952 B2 | 12/2013 | Roddy et al. |
| 2002/0004464 A1 | 1/2002 | Nelson et al. |
| 2002/0033121 A1 | 3/2002 | Marko |
| 2002/0073894 A1 | 6/2002 | Genge et al. |
| 2002/0073897 A1 | 6/2002 | Trato |
| 2002/0117090 A1 | 8/2002 | Ku |
| 2002/0193257 A1 | 12/2002 | Lee et al. |
| 2003/0089281 A1 | 5/2003 | Berke et al. |
| 2003/0095906 A1 | 5/2003 | Bauer et al. |
| 2003/0116065 A1 | 6/2003 | Griffith et al. |
| 2003/0116887 A1 | 6/2003 | Scott |
| 2003/0121456 A1* | 7/2003 | Griffith et al. ............ 106/724 |
| 2003/0121660 A1* | 7/2003 | Griffith et al. ............ 166/292 |
| 2003/0134751 A1 | 7/2003 | Lee et al. |
| 2003/0167970 A1 | 9/2003 | Polston |
| 2003/0168215 A1* | 9/2003 | Drochon et al. ............ 166/276 |
| 2003/0220204 A1 | 11/2003 | Baran et al. |
| 2003/0234103 A1* | 12/2003 | Lee et al. ............ 166/293 |
| 2004/0007162 A1 | 1/2004 | Morioka et al. |
| 2004/0040475 A1 | 3/2004 | De La Roij et al. |
| 2004/0055748 A1 | 3/2004 | Reddy et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0121916 A1 | 6/2004 | Kono |
| 2004/0144537 A1 | 7/2004 | Reddy et al. |
| 2004/0171499 A1 | 9/2004 | Ravi et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0261990 A1 | 12/2004 | Bosma et al. |
| 2004/0261999 A1 | 12/2004 | Nguyen |
| 2005/0000734 A1 | 1/2005 | Getzlaf et al. |
| 2005/0022991 A1 | 2/2005 | Rao |
| 2005/0034867 A1 | 2/2005 | Griffith et al. |
| 2005/0056191 A1 | 3/2005 | Brothers et al. |
| 2005/0061206 A1 | 3/2005 | Reddy et al. |
| 2005/0072599 A1 | 4/2005 | Luke et al. |
| 2005/0084334 A1 | 4/2005 | Shi et al. |
| 2005/0096207 A1 | 5/2005 | Urbanek |
| 2005/0098317 A1 | 5/2005 | Reddy et al. |
| 2005/0113260 A1 | 5/2005 | Wood |
| 2005/0113262 A1 | 5/2005 | Ravi et al. |
| 2005/0133221 A1 | 6/2005 | Chatterji et al. |
| 2005/0172864 A1* | 8/2005 | Dingsoyr et al. ............ 106/737 |
| 2005/0173117 A1 | 8/2005 | Roddy |
| 2005/0199401 A1 | 9/2005 | Patel et al. |
| 2006/0016598 A1 | 1/2006 | Urbanek |
| 2006/0025312 A1 | 2/2006 | Santra et al. |
| 2006/0086503 A1 | 4/2006 | Reddy et al. |
| 2006/0089851 A1 | 4/2006 | Silby et al. |
| 2006/0122071 A1 | 6/2006 | Reddy et al. |
| 2006/0162926 A1 | 7/2006 | Roddy |
| 2006/0166834 A1 | 7/2006 | Roddy |
| 2006/0177661 A1 | 8/2006 | Smith et al. |
| 2006/0260512 A1 | 11/2006 | Nordmeyer |
| 2006/0260513 A1 | 11/2006 | Guiterrez et al. |
| 2006/0278131 A1 | 12/2006 | Hunt |
| 2007/0012436 A1 | 1/2007 | Freyer |
| 2007/0015668 A1 | 1/2007 | Harrower et al. |
| 2007/0017676 A1 | 1/2007 | Reddy et al. |
| 2007/0056475 A1 | 3/2007 | Roddy et al. |
| 2007/0056479 A1 | 3/2007 | Gray |
| 2007/0056732 A1* | 3/2007 | Roddy et al. ............ 166/292 |
| 2007/0056733 A1 | 3/2007 | Roddy et al. |
| 2007/0062691 A1 | 3/2007 | Reddy et al. |
| 2007/0102157 A1 | 5/2007 | Roddy et al. |
| 2007/0125534 A1 | 6/2007 | Reddy et al. |
| 2007/0137528 A1 | 6/2007 | LeRoy-Deluge et al. |
| 2007/0151484 A1 | 7/2007 | Reddy et al. |
| 2007/0151724 A1 | 7/2007 | Ohmer et al. |
| 2007/0151730 A1 | 7/2007 | Reddy et al. |
| 2007/0186820 A1 | 8/2007 | O'Hearn |
| 2007/0204765 A1 | 9/2007 | LeRoy-Deluge et al. |
| 2007/0227734 A1 | 10/2007 | Freyer |
| 2007/0246225 A1 | 10/2007 | Hailey, Jr. et al. |
| 2007/0255457 A1 | 11/2007 | Whitcomb et al. |
| 2007/0266903 A1 | 11/2007 | Gartner et al. |
| 2008/0017376 A1 | 1/2008 | Badalamenti et al. |
| 2008/0058229 A1 | 3/2008 | Berkland et al. |
| 2008/0099203 A1 | 5/2008 | Mueller et al. |
| 2008/0108524 A1 | 5/2008 | Willberg et al. |
| 2008/0135250 A1 | 6/2008 | Bosma et al. |
| 2008/0156491 A1 | 7/2008 | Roddy et al. |
| 2008/0261027 A1 | 10/2008 | Li et al. |
| 2008/0261834 A1 | 10/2008 | Simon |
| 2008/0261934 A1 | 10/2008 | Simon |
| 2008/0277116 A1 | 11/2008 | Roddy et al. |
| 2009/0088348 A1 | 4/2009 | Roddy |
| 2009/0114126 A1 | 5/2009 | Roddy |
| 2009/0120644 A1 | 5/2009 | Roddy |
| 2009/0124522 A1* | 5/2009 | Roddy ............ 507/269 |
| 2009/0139719 A1 | 6/2009 | Luo |
| 2009/0200029 A1 | 8/2009 | Roddy et al. |
| 2009/0236097 A1* | 9/2009 | Roddy et al. ............ 166/293 |
| 2009/0260544 A1 | 10/2009 | Roddy |
| 2010/0016183 A1* | 1/2010 | Roddy et al. ............ 507/225 |
| 2010/0025039 A1 | 2/2010 | Roddy et al. |
| 2010/0075874 A1 | 3/2010 | Mercado et al. |
| 2010/0096135 A1 | 4/2010 | Roddy et al. |
| 2010/0193982 A1 | 8/2010 | Genolet et al. |
| 2011/0162845 A1 | 7/2011 | Ravi et al. |
| 2011/0237467 A1 | 9/2011 | Cornette et al. |
| 2011/0312857 A1 | 12/2011 | Amanullah |
| 2012/0015852 A1 | 1/2012 | Quintero et al. |

FOREIGN PATENT DOCUMENTS

| | | | |
|---|---|---|---|
| CN | 101544488 A | 9/2009 | |
| DE | 102007042078 A1 | 3/2009 | |
| DE | 102007059424 A1 | 6/2009 | |
| EP | 0748782 | 12/1996 | |
| EP | 0748782 A1 | 12/1996 | |
| EP | 0814067 A1 | 12/1997 | ............ C04B 28/06 |
| EP | 1236701 A1 | 9/2002 | ............ C04B 28/04 |
| EP | 1394137 A2 | 7/2003 | ............ C04B 38/08 |
| EP | 1348831 A1 | 10/2003 | ............ E21B 33/13 |
| EP | 1686234 A1 | 8/2006 | |

(56) References Cited

FOREIGN PATENT DOCUMENTS

| | | | |
|---|---|---|---|
| EP | 1719741 A1 | 11/2006 | |
| EP | 2465910 A1 | 11/2009 | |
| FR | 2787105 | 6/2000 | |
| FR | 2787105 A1 | 6/2000 | |
| GB | 1469954 | 4/1997 | ............ C04B 24/36 |
| GB | 2429725 A | 3/2007 | |
| JP | 52117316 A | 10/1977 | ............ C04B 13/02 |
| JP | 10110487 A | 4/1998 | ............ E04B 1/78 |
| SU | 1373781 A1 | 2/1988 | ............ E04G 21/12 |
| WO | WO 83/01443 A1 | 4/1983 | ............ C04B 7/14 |
| WO | 90/11977 | 4/1990 | |
| WO | 9011977 | 10/1990 | |
| WO | WO 9011977 A1 * | 10/1990 | |
| WO | WO 97/05079 A1 | 2/1997 | |
| WO | WO 97/49644 A1 | 12/1997 | |
| WO | WO 98/54108 A1 | 12/1998 | ............ C04B 28/02 |
| WO | WO 00/63134 A1 | 1/2000 | ............ C04B 28/02 |
| WO | WO 00/49272 A1 | 8/2000 | |
| WO | WO 00/50357 A1 | 8/2000 | |
| WO | WO 01/87796 A1 | 11/2001 | |
| WO | WO 03/008756 A1 | 1/2003 | |
| WO | WO 03/031364 A1 | 4/2003 | ............ C04B 18/06 |
| WO | WO 04/001188 A1 | 12/2003 | |
| WO | WO 2004/057715 A2 | 7/2004 | |
| WO | WO 2004/101951 A1 | 11/2004 | |
| WO | WO 2004/101952 A1 | 11/2004 | |
| WO | WO 2005/047212 A1 | 5/2005 | ............ C04B 38/10 |
| WO | WO 2005/061846 A1 | 7/2005 | ............ E21B 33/13 |
| WO | WO 2005/080287 A1 | 8/2005 | |
| WO | WO 2006/032841 A1 | 3/2006 | |
| WO | WO 2006/053896 A1 | 5/2006 | |
| WO | 2008034461 | 3/2008 | |
| WO | WO 2008/034461 A1 | 3/2008 | |
| WO | WO 2009/030758 A1 | 3/2009 | |

OTHER PUBLICATIONS

Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38 , 1990.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art, Petroleum Engineer International", Apr. 1978.
Sugama, "Carbonation of Hydrothermally Treated Phosphate-Bonded Calcium Aluminate Cements", pp. 1-9 (undated but admitted as prior art).
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder" dated 1999.
HES Brochure "HR-4 Cement Retarder", 1999.
HES Brochure HR-5 Cement Additive, 1998.
HES Brochure "HR-7 Cement Retarder", 1999.
HES Brochure "Pozmix A Cement Additive", 1999.
HES Brochure "Pozmix Cement and Pozmix 140" (undated but admitted as prior art).
HES Brochure "SCR-100 Cement Retarder A Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LAFARGE brochure "TerraCem™", Aug. 2006.
LAFARGE MSDS "Cement Kiln Dust", Mar. 3, 2005.
LAFARGE MSDS "LaFarge Blended Cement (cement)", Mar. 3, 2005.
TXI Material Safety Data Sheet for Pressur-Seal, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-793, 2005.
Answer 13 of 24 Chemical Abstracts on STN "Manufacture of ceramic particles from floatstone and fly ash", CN 1182062 (abstract only) (undated but admitted as prior art).
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431, (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/416,754 (Notice of Allowance), Jul. 2, 2007.
Office Action from U.S. Appl. No. 11/223,485 (Notice of Allowance), Aug. 3, 2007.
Office Action from U.S. Appl. No. 11/257,261, Aug. 10, 2007.

(56) References Cited

OTHER PUBLICATIONS

Office Action from U.S. Appl. No. 11/271,690 (Notice of Allowance), Aug. 13, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/416,754 (Notice of Allowance), Oct. 17, 2007.
Office Action from U.S. Appl. No. 11/257,261 (Notice of Allowance), Oct. 23, 2007.
Office Action from U.S. Appl. No. 11/402,741, Oct. 24, 2007.
Office Action from U.S. Appl. No. 11/223,750 (Notice of Allowance), Dec. 11, 2007.
Office Action from U.S. Appl. No. 11/402,741 (Notice of Allowance), Dec. 13, 2007.
Office Action from U.S. Appl. No. 11/223,669, Jan. 29, 2008.
Office Action from U.S. Appl. No. 11/256,824 (Notice of Allowance), Feb. 27, 2008.
Office Action from U.S. Appl. No. 11/223,703 (Notice of Allowance), Feb. 27, 2008.
Office Action from U.S. Appl. No. 11/223,669, Apr. 8, 2008.
Office Action from U.S. Appl. No. 11/223,669 (Notice of Allowance), Jun. 30, 2008.
Foreign Search Report from a Related Application, Sep. 9, 2005.
Foreign Search Report from a Related Application, Jul. 5, 2006.
Foreign Search Report from a Related Application, Oct. 27, 2006.
Foreign Search Report from a Related Application, Nov. 2, 2006.
Foreign Search Report from a Related Application, Dec. 1, 2006.
Foreign Search Report from a Related Application, Dec. 19, 2006.
Foreign Search Report from a Related Application, May 8, 2007.
Office Action from U.S. Appl. No. 12/034,886 (Notice of Allowance), Oct. 21, 2008.
Harris et al., "Successful Remedial Operations Using Ultrafine Cement", SPE 24294, 1992.
Heathman et al., "Case Histories Regarding the Application of Microfine Cements", Cementing Technical Paper SPE 23926, 1992.
Halliburton brochure entitled "Micro Matrix Cement", Nov. 2006.
Dalrymple et al., "A Selective Water Control Process", SPE 24330, 1992.
Halim et al., "Preparation of an ultra fast binding cement from calcium silicate-based mixed oxide nanoparticles", Nanotechnology 18, 2007.
Epik Energy brochure entitled "Nanocement".
Nanocor brochure entitled "Nanoclay Structure", Jun. 24, 2008.
He et al., "Chloride Permeability and Microstructure of Portland Cement Mortars Incorporating Nanomaterials", Abstract, Transportation Research Board Annual Meeting 2007 Paper #08-1041, 2008.
Chang et al., "Material Properties of Portland Cement Paste with Nano-Montmorillonite," J. Material Science, May 18, 2007.
Foreign communication from a related counterpart application, Jul. 5, 2005.
Office Action from U.S. Appl. No. 10/775,348, Nov. 23, 2005.
Office Action from U.S. Appl. No. 10/775,348, May 2, 2006.
Notice of Allowance from U.S. Appl. No. 10/775,348, Jun. 6, 2006.
Foreign communication from a related counterpart application, Jun 29, 2007.
Notice of Allowance from U.S. Appl. No. 11/388,644, Jan. 3, 2008.
Office Action from U.S. Appl. No. 12/008,923, May 20, 2008.
Notice of Allowance from U.S. Appl. No. 12/008,923, Jul. 22, 2008.
Office Action from U.S. Appl. No. 11/388,645, Apr. 3, 2009.
Office Action from U.S. Appl. No. 11/388,645, Jul. 30, 2009.
Nanocor Technical brochure entitled "Nanoclay Structures", Mar. 18, 2009.
Nanofil SE 3000, "Active nanofiller for polymr applications", Product Bulletin/Nanofil, Southern Clay Products.
Halliburton brochure entitled, "Cementing WellLife III Cementing Service", Apr. 2008.
Darbe, "Slurry Design Considerations for Mechanically Enhanced Cement Systems", AADE-08-DF-HO-06, 2008.
Halamickova, "Water Permeability and Chloride Ion Diffusion in Portland Cement Mortars: Relationship to Sand Content and Critical Pore Diameter", Cement and Concrete Research, vol. 25, No. 4, pp. 790-802, 1995.
Montmorillonite, Wikipedia encyclopedia, 2009.
Ravi, "Interventionless Zonal Isolation", Cementing, May 2008.
Schlumberger brochure, "Futur Active set-cement technology for long-term zonal isolation", 2007.
Halliburton brochure, "WellLife III Cementing Service for CO2 Environments", Jun. 2009.
Hunter, "Three Key Mechanisms Deliver Zonal Isolation", IADC.
Office Action from U.S. Appl. No. 11/747,002, Apr. 2, 2008.
Office Action from U.S. Appl. No. 11/747,002, May 27, 2008.
Office Action from U.S. Appl. No. 11/747,002, Jul. 10, 2008.
Office Action from U.S. Appl. No. 11/747,002, Mar. 3, 2009.
PCT International Searching Authority for International Application No. PCT/GB2009/002596, Feb. 8, 2010.
Office Action from U.S. Appl. No. 12/426,645, May 5, 2010.
Office Action from U.S. Appl. No. 12/472,561, May 5, 2010.
PCT International Search Report and Written Opinion for International Application No. PCT/GB2010/000485, May 21, 2010.
"Effect of Nano-SiO2 on heat of hydration of portland cement," Xu et al., Nanjing Gongye Daxue Xuebao, Ziran Kexeuban, 29(4), 45-48, abstract only, 2007.
"Application of nanometer silica in inorganic nonmetallic materials," Deng et al., Taoci (Xiangyang China), (9), 8-12, abstract only, 2007.
"Reaction mechanism analyses of cement based composite materials modified by nano-silica," Xu et al., Kuangye Gongcheng (Changsha, China), 27(3), 99-102, abstract only, 2007.
"Research on Reinforcement of cement composites and relevant mechanism," Yu et al., Qiangdoa Keji Daxue Xuebao, Ziran Kexueban, 27(2), 148-151, abstract only, 2006.
"Antagonistic Effect of superplasticizer and colloidal nanosilica in the hydration of Alite and Belite pastes," Bjoernstrom et al., Journal of Materials Science, 42(11), 3901-3907, abstract only, 2007.
"Nano-concrete: possibilities and challenges," Balaguru et al., RILEM Proceedings (2005), PRO 45 (2nd Int'l Symposium on Nanotechnology in construction (NICOM2), 233-243, abstract only, 2005.
"A comparative study on the pozzolanic activity between nano-SiO2 and silica fume," Ye et al., Journal of Wuhan Univ of Technology, Mat'ls Science Edition, 21(3), 153-157, abstract only, 2006.
"Optimization of silica fume, fly ash and amorphous nano-silica in superplasticized high-performance concrete," Collepardi et al., American Concrete Institute, SP 2004, SP-221 (Eight CANMET/ACI International Conference on Fly Ash, Silica Fume, Slag, and Natrural Pozzolans in Concrete), 495-505, abstract only, 2004.
"Accelerating effects of colloidal nano-silica for beneficial calcium-silicate-hydrate formation in cement," Bjornstrom et al., Chemical Physics Letters, 392 (1-3), 242-248, abstract only, 2004.
"Experimental study on cement-based composites with nano-SiO2," Feng et al., Cailiao Kexue Yu Gongcheng Zuebao Bianjibu, 22(2), 224-227, 2004.
"Strong and bioactive composites containing nano-silica-fused whiskers for bone repair," Xu et al., Biomaterials, 25(19), 4615-4626, abstract only, 2004.
Research on properties of Portland cement added with nano-SiO2, Wang et al., RILEM Proceedings (2003), PRO 32 (International Conference on Advances in Concrete and Structures, vol. 1), 154-161, abstract only, 2003.
"Comparison on properties of high strength concrete with nano-SiO2 and silica fume added," Ye et al., Jianzhu Cailiao Xuebao, 6(4), 381-385, abstract only, 2003.
"Study on compound effect of silica fume and nano-SiOx for cementing composite materials," Tang et al., Guisuanyan Xuebao, 3(5), 523-527, abstract only, 2003.
"Effect of nano-SiOx and silica fume on cement paste water demand," Li et al., Shenyang Jianzhu gongcheng Xueyuan Xuebao, Ziran Kexueban, 18(4), 278-281, abstract only, 2002.
"Hydration reaction between C3S and fly ash, silica fume, nano-SiO2, and microstructure of hydrated pastes," Ba et al., Guisuanyan Xuebao, 30(6), 780-784, abstract only, 2002.

(56) References Cited

OTHER PUBLICATIONS

"Nano-silica—an additive for high-strength concrete," Wagner et al., Wissenschaftliche Zeitschrift—Hoschule fuer Architektur and Bauwesen Weimar—Universitaet, 40 (5/6/7), 183-87, abstract only, 1994.
"Investigations on the preparation and mechanical properties of the nano-alumina reinforced cement composite," Li et al., Materials Letters, 0(3), 356-359, abstract only, 2006.
"Effect of secondary interface microstructure on pore structure and performance of cement-based materials," Feng et al., Cailiao Yanjiu Xuebao, 17(5), 489-494, abstract only, 2003.
"Preparation of multifunctional dry-power paints," Yanmin Gao, Faming Zhuanli Shenqing gongkai Shuomingshu, 4 pages, abstract only, 2005.
Office Action from U.S. Appl. No. 12/426,393, Jul. 2, 2010.
Notice of Allowance from U.S. Appl. No. 12/472,561, Jun. 29, 2010.
PCT International Search Report and Written Opinion for International Application No. PCT/GB2010/001045, Jul. 21, 2010.
Office Action from U.S. Appl. No. 11/388,645, Aug. 17, 2010.
Office Action from U.S. Appl. No. 12/833,189, Oct. 1, 2010.
Office Action from U.S. Appl. No. 12/833,189, Nov. 10, 2010.
Notice of Allowance from U.S. Appl. No. 12/426,393, Dec. 16, 2010.
PCT International Search Report and Written Opinion for International Application No. PCT/GB2010/001806, Jan. 20, 2011.
English language abstract of CN 101544488, Sep. 30, 2009.
Office Action from U.S. Appl. No. 12/833,189, Feb. 17, 2011.
Howard, "An Analysis and the Control of Lost Circulation", Petroleum Transactions, AIME, vol. 192, pp. 171-182, 1951.
Darley, "Composition and Properties of Drilling and Completion Fluids", Fifth Edition, Gulf Publishing Company, pp. 446-454; 595-598, 1988.
HES Brochure "Latex 2000", Aug. 2006.
Campillo et al., "Improvement of initial mechanical strength by nanoalumina in belite cements", Science Direct, Materials Letters 61, pp. 1889-1892, 2007.
PCT International Search Report and Written Opinion for International Application No. PCT/GB2011/000003, Apr. 18, 2011.
"Effect of the particle size on the micro and nanostructural features of calcium phosphate cement: a kinetic analysis", Biomaterials 25, 3453-3462, 2004.
Office Action from U.S. Appl. No. 12/567,782, Apr. 5, 2011.
Office Action from U.S. Appl. No. 12/651,662, Apr. 5, 2011.
Office Action from U.S. Appl. No. 12/567,783, Apr. 6, 2011.
Office Action from U.S. Appl. No. 12/263,954, Apr. 20, 2011.
Office Action from U.S. Appl. No. 12/651,662, Apr. 22, 2011.
Office Action from U.S. Appl. No. 12/567,782, Apr. 25, 2011.
Office Action from U.S. Appl. No. 12/833,189, May 16, 2011.
Office Action from U.S. Appl. No. 12/833,189, Jul. 18, 2011.
Office Action from U.S. Appl. No. 12/263,954, Aug. 8, 2011.
Office Action from U.S. Appl. No. 12/567,783, Aug. 23, 2011.
Office Action from U.S. Appl. No. 12/833,189, Oct. 11, 2011.
Office Action from U.S. Appl. No. 12/651,662, Nov. 28, 2011.
Office Action from U.S. Appl. No. 12/833,189, Feb. 7, 2012.
Office Action from U.S. Appl. No. 12/567,782, Mar. 2, 2012.
Office Action from U.S. Appl. No. 13/052,471, Mar. 6, 2012.
Office Action from U.S. Appl. No. 12/651,662, Mar. 14, 2012.
International Search Report for PCT/GB2010/001805 dated Mar. 31, 2011.
Written Opinion for PCT/GB2010/001805 dated Mar. 27, 2012.
USPTO Office Action for U.S. Appl. No. 13/431,701 dated Nov. 9, 2012.
USPTO Office Action for U.S. Appl. No. 12/567,782 dated Jul. 25, 2012.
USPTO Office Action for U.S. Appl. No. 12/651,662 dated Aug. 2, 2012.
USPTO Office Action for U.S. Appl. No. 13/052,471 dated Jun. 28, 2012.
Written Opinion of the International Searching Authority for PCT/GB/2010/000485 dated Oct. 25, 2011.
Written Opinion of the International Searching Authority for PCT/GB/2011/000003 dated Jul. 12, 2012.
Communication from EPO for EPO App. No. 12159772.8 dated May 3, 2012.
Li et al., " Investigations on the preparation and mechanical properties of the nano-alumina reinforced cement composite", Science Direct, Materials Letters 60, pp. 356-359, 2006.
Office Action from USPTO for U.S. Appl. No. 12/567,782 dated Jun. 21, 2013.
Final Office Action from USPTO for U.S. Appl. No. 13/052,471 dated May 10, 2013.
Office Action from USPTO for U.S. Appl. No. 13/431,701 dated Jul. 11, 2013.
Search Report and Written Opinion for PCT/US2013/038343 dated Jul. 31, 2013.
Andrew R. Barron, Chemical composition of Portland Cement, viewed on Aug. 26, 2013, last edited by author on Jan. 4, 2010.
International Preliminary Report and Written Opinion of PCT/GB2010/001806 dated Mar. 27, 2012.
Office Action from USPTO for U.S. Appl. No. 13/458,112 dated Sep. 5, 2013.
USPTO Office Action from U.S. Appl. No. 12/567,782 dated Feb. 8, 2013.
USPTO Office Action from U.S. Appl. No. 13/435,701 dated Feb. 19, 2013.
USPTO Office Action from U.S. Appl. No. 12/651,662 dated Feb. 13, 2013.
USPTO Office Action from U.S. Appl. No. 12/833,189 dated Feb. 6, 2013.
International Search Report and Written Opinion for PCT/GB2010/0010445 dated Jul. 21, 2010.
USPTO Office Action from U.S. Appl. No. 13/052,471 dated Feb. 4, 2013.
USPTO Office Action from U.S. Appl. No. 12/263,954 dated Mar. 14, 2013.
USPTO Office Action from U.S. Appl. No. 13/458,112 dated Mar. 15, 2013.
International Report on Patentability for PCT/GB2009/002596 dated May 3, 2011.
USPTO Notice of Allowability from U.S. Appl. No. 12/651,662 dated May 6, 2013.
USPTO Office Action from U.S. Appl. No. 12/833,189 dated May 28, 2013.
USPTO Office Action from U.S. Appl. No. 13/435,701 dated Jun. 4, 2013.
USPTO Office Action for U.S. Appl. No. 12/263,954 dated Oct. 8, 2013.
USPTO Office Action for U.S. Appl. No. 12/567,783 dated Oct. 3, 2013.
USPTO Office Action for U.S. Appl. No. 13/435,701 dated Oct. 4, 2013.
USPTO Final Office Action for U.S. Appl. No. 13/458,112 dated Dec. 26, 2013.
USPTO Notice of Allowance for U.S. Appl. No. 13/052,471 dated Jan. 30, 2014.
EPO Office Action for 09751959.9 dated Sep. 27, 2013.
HES Brochure "FlexPlug Services" dated Apr. 2008.
HES Brochure "Thermatek Services" dated May 2005.
HES Brochure "Fuse-It Circulation Treatment" dated May 2006.

* cited by examiner

LOST CIRCULATION COMPOSITIONS AND ASSOCIATED METHODS

CROSS-REFERENCE TO RELATED APPLICATIONS

The present application is a division of U.S. patent application Ser. No. 13/052,471, filed Mar. 21, 2011, entitled "Lost Circulation Compositions and Associated Methods," which is a continuation-in-part of U.S. patent application Ser. No. 12/567,782, filed Sep. 27, 2009, entitled "Cement Compositions and Methods Utilizing Nano-Clay," which is a continuation-in-part of U.S. patent application Ser. No. 12/263,954, filed Nov. 3, 2008, entitled "Cement Compositions and Methods Utilizing Nano-Hydraulic Cement," which is a continuation-in-part of U.S. patent application Ser. No. 11/747,002, now U.S. Pat. No. 7,559,369, filed on May 10, 2007, entitled "Well Treatment Compositions and Methods Utilizing Nano-Particles." The entire disclosures of these applications are incorporated herein by reference.

BACKGROUND

The present invention relates to servicing a well bore and, in certain embodiments, to the introduction of compositions into a well bore to reduce the loss of fluid into the formation.

A natural resource such as oil or gas residing in a subterranean formation can be recovered by drilling a well bore into the formation. A well bore is typically drilled while circulating a drilling fluid through the well bore. Among other things, the circulating drilling fluid may lubricate the drill bit, carry drill cuttings to the surface, and balance the formation pressure exerted on the well bore. One problem associated with drilling may be the undesirable loss of drilling fluid to the formation. Such lost fluids typically may go into, for example, fractures induced by excessive mud pressures, into pre-existing open fractures, or into large openings with structural strength in the formation. This problem may be referred to as "lost circulation," and the sections of the formation into which the drilling fluid may be lost may be referred to as "lost circulation zones." The loss of drilling fluid into the formation is undesirable, inter alia, because of the expense associated with the drilling fluid lost into the formation, loss of time, additional casing strings and, in extreme conditions, well abandonment. In addition to drilling fluids, problems with lost circulation may also be encountered with other fluids, for example, spacer fluids, completion fluids (e.g., completion brines), fracturing fluids, and cement compositions that may be introduced into a well bore.

One method that has been developed to control lost circulation involves the placement of lost circulation materials into the lost circulation zone. Conventional lost circulation materials may include fibrous, lamellated or granular materials. The lost circulation materials may be placed into the formation, inter alia, as part of a drilling fluid or as a separate lost circulation pill in an attempt to control and/or prevent lost circulation. For a number of reasons, use of lost circulation materials may not provide a desirable level of lost circulation control in all circumstances.

Another method that has been developed to control lost circulation involves the placement of a settable composition into the well bore to seal the lost circulation zone. To be effective, the settable composition should ideally maintain a low viscosity while under shear, but, when allowed to remain static, the composition should develop gel strength quickly with the ability to thin and flow when shear is re-applied. Rapid development of compressive strength is also desired after placement into the lost circulation zone. Conventional low-density cement compositions can be used, but typically do not exhibit the properties to successfully seal the zone. Faster setting compositions that can be used include, for example, mixtures of clay and aqueous rubber latex or hydratable polymers, which can become semi-solid upon contact with the drilling fluid, sealing the lost circulation zone. Cement can be added to these systems where additional strength is desired. Drawbacks to these faster setting compositions include lack of bonding to the subterranean formation, lack of ability to thin when shear is re-applied and dependency upon mixing of two streams, which can be very difficult to control.

SUMMARY

The present invention relates to servicing a well bore and, in certain embodiments, to the introduction of compositions into a well bore to reduce the loss of fluid into the formation.

An embodiment includes a method of servicing a well bore. The method may comprise introducing a lost circulation composition into a lost circulation zone, the lost circulation composition comprising hydraulic cement, nano-particles, amorphous silica, clay, and water. The method further may comprise allowing the lost circulation composition to set in the lost circulation zone.

Another embodiment includes a method of servicing a well bore. The method may comprise introducing a lost circulation composition into a lost circulation zone. The lost circulation composition may comprise Portland cement in an amount of about 10% to about 20% by weight of the lost circulation composition, nano-silica in an amount of about 0.5% to about 4% by weight of the lost circulation composition, the nano-silica having a particle size of about 1 nanometer to about 100 nanometers, amorphous silica in an amount of about 5% to about 10% by weight of the lost circulation composition, synthetic clay in an amount of about 0.5% to about 2% by weight of the lost circulation composition, and water in an amount of about 60% to about 75% by weight of the lost circulation composition. The method further may comprise allowing the lost circulation composition to set in the lost circulation zone.

Yet another embodiment includes a lost circulation composition. The lost circulation may comprise hydraulic cement, nano-particles, amorphous silica, clay, and water.

The features and advantages of the present invention will be apparent to those skilled in the art upon reading the following description of specific embodiments.

BRIEF DESCRIPTION OF THE DRAWINGS

These drawings illustrate certain aspects of some of the embodiments of the present invention, and should not be used to limit or define the invention.

DESCRIPTION OF SPECIFIC EMBODIMENTS

The present invention relates to servicing a well bore and, in certain embodiments, to the introduction of compositions into a well bore to reduce the loss of fluid into the formation. There may be several potential advantages to the methods and compositions of the present invention, only some of which may be alluded to herein. One of the many potential advantages of the methods and compositions of the present invention is that the lost circulation compositions should develop sufficient static gel strength in a short time frame to be effective at lost circulation control. Another potential advantage is that the lost circulation compositions should be shear sensitive so that the compositions should remain pumpable for sufficient time for placement, but when static, the compositions should develop gel strength in a short period of time followed by rapid compressive strength development. The lost circulation composition should develop gel strength when shear is removed, but should thin when the shear is re-applied. The lost circulation composition properties described above should not be overly dependent on the temperature of the well, for example.

An embodiment of the lost circulation compositions of the present invention may comprise hydraulic cement, nano-particles, amorphous silica, clay, and water. Those of ordinary skill in the art will appreciate that embodiments of the lost circulation compositions generally should have a density suitable for a particular application. By way of example, the lost circulation compositions may have a density in the range of from about 6 pounds per gallon ("ppg") to about 14 ppg. In certain embodiments, the lost circulation compositions may have a density in the range of from about 8 ppg to about 12 ppg and, alternatively, about 9 ppg to about 11 ppg. Embodiments of the lost circulation compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Embodiments of the lost circulation compositions of the present invention may comprise hydraulic cement. The hydraulic cement should, for example, provide bonding of the lost circulation composition to the formation in addition to compressive strength. Any of a variety of hydraulic cements suitable for use in subterranean operations may be used in accordance with embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, and combinations thereof. In certain embodiments, the hydraulic cement may comprise a Portland cement. Portland cements that may be suited for use in embodiments of the present invention may be classified as Class A, C, H and G cements according to American Petroleum Institute, API Specification for Materials and Testing for Well Cements, API Specification 10, Fifth Ed., Jul. 1, 1990. In addition, in some embodiments, hydraulic cements suitable for use in the present invention may be classified as ASTM Type I, II, or III.

The hydraulic cement may be present in the lost circulation composition in an amount, for example, of about 0.1% to about 25% by weight of the composition. In some embodiments, the hydraulic cement may be present in amount of about 10% to about 20% by weight of the composition. In some embodiments, the hydraulic cement may be present in amount of about 13% to about 20% by weight of the composition. One of ordinary skill in the art, with the benefit of this disclosure, will recognize the appropriate amount of the hydraulic cement to include for a chosen application.

Embodiments of the lost circulation compositions further may comprise nano-particles. Examples of suitable nano-particles include nano-silica, nano-alumina, nano-zinc oxide, nano-boron, nano-iron oxide, nano-calcium carbonate, nano-clays, and combinations thereof. In an embodiment, the nano-particles comprise nano-silica. The nano-particles may be present in the lost circulation compositions in an amount of from about 0.1% to about 10% by weight of the composition, for example. In an embodiment, the nano-particles may be present in the lost circulation composition in an amount of about 0.5% to about 5% by weight of the composition. In an embodiment, the nano-particles may be present in the lost circulation composition in an amount of about 1% to about 5% by weight of the composition. One of ordinary skill in the art, with the benefit of this disclosure, will recognize the appropriate amount of the nano-particles to include for a chosen application.

In an embodiment, the nano-silica may include colloidal nano-silica. An example of a suitable colloidal nano-silica is Cemsyn LP, which is available from by Bee Chems, India. The nano-silica may be present in the lost circulation composition in an amount of about 0.1% to about 5% by weight of the composition, for example. In an embodiment, the nano-silica may be present in the lost circulation composition in an amount of about 0.5% to about 4% by weight of composition. In an embodiment, the nano-silica may be present in the lost circulation composition in an amount of about 1% to about 3% by weight of composition. One of ordinary skill in the art, with the benefit of this disclosure, will recognize the appropriate amount of the nano-silica to include for a chosen application. While the nano-particles may include nano-silica, it should be understood that the lost circulation composition may comprise less than about 25% silica by weight of the hydraulic cement on a dry basis ("bwoc"), in accordance with embodiments of the present invention. Furthermore, it should be understood that the nano-silica may be essentially free of silica fume, in accordance with embodiments of the present invention.

Generally, the term "nano-particle" is defined as having a particle size of less than or equal to about 100 nanometers ("nm"). As used herein, "particle size" refers to volume surface mean diameter ("Ds") which is related to the specific surface area. Volume surface mean diameter may be defined by the following formula: $D_S=6/(\Phi_S A_w \rho_p)$ where $\Phi_S$=sphericity; $A_w$=Specific surface area and $\rho_p$=Particle density. It should be understood that the particle size of the nano-particle may vary based on the measurement technique, sample preparation, and sample conditions (e.g., temperature, concentration, etc.). One technique for measuring particle size of the nano-particle at room temperature (approx. 80° F.) includes dispersing the nano-particle in a suitable solvent (such as chloroform, dichloroethane, acetone, methanol, ethanol, water, etc.) by sonification and proper dilution. A dispersing agent may be used to deagglomerate the nano-particles, if needed. The diluted, dispersed solution may then be placed on a carbon-coated copper grid with 300 mesh size by using a micropipette. It may then be dried and examined by Transmission electron microscopy (TEM). The particle size distribution may be obtained with high accuracy using an appropriate computation technique. By way of example, TEM image processing may use image-processing software such as Image-Pro® Plus software from Media Cybernetics to determine the particle size. Another example technique involves use of calibrated drawing tools in Digital Micrograph software followed by statistical analysis of the data with Kaleida-Graph software to determine the particle size.

In certain embodiments, the nano-particles may have a particle size in the range of from about 1 nm to about 100 nm (about $1 \times 10^{-9}$ m to about $100 \times 10^{-9}$ m). In certain exemplary embodiments, the nano-particle may have a particle size of less than or equal to about 50 nm. For example, the nano-particles may have a particle size in the range of from about 5 nm to about 50 nm. In further exemplary embodiments, the nano-particles may have a particle size of less than or equal to about 30 nm. For example, the nano-particles may have a particle size in the range of from about 5 nm to about 30 nm. In certain embodiments, the nano-particles may comprise colloidal silica having a particle size in the range of from about 5 nm to about 20 nm. However, it should be noted that the particular nano-particle chosen may be used in combination with differently sized particles of the same material, in accordance with present embodiments. For example, where nano-silica is used, silica with particle sizes greater than 100 nm may be included in a cement composition in accordance with present embodiments.

It is now recognized that the nano-particles utilized in combination with the hydraulic cement in the present embodiments, may have an impact on certain characteristics of the lost circulation compositions that should enable the compositions to effectively control lost circulation. Among other things, inclusion of the nano-particles should provide lost circulations compositions that develop rapid static gel strength while remaining pumpable for long periods of time when under shear, thus allowing sufficient time for placement, in accordance with embodiments of the present invention. For example, inclusion of nano-silica and synthetic clay in a lost circulation composition comprising hydraulic cement and amorphous silica provided a composition characterized by rapid static gel strength followed by compressive strength development. However, even though the composition developed rapid static gel strength, the composition was further characterized by thickening times while under shear that should allow placement into a lost circulation zone.

Embodiments of the lost circulation compositions further may comprise amorphous silica. Among other things, the amorphous silica may impart viscosity to the lost circulation composition. In general, amorphous silica is a high surface area, non-crystalline form of silica. An example of a suitable amorphous silica is Silicalite™ cement additive, available from Halliburton Energy Services, Inc. The amorphous silica may be present in the lost circulation compositions, for example, in an amount of about 0.1% to about 15% by weight of the composition, for example. In an embodiment, the amorphous silica may be present in an amount of about 1% to about 15% by weight of the composition. In an embodiment, the amorphous silica may be present in an amount of about 5% to about 10% by weight of the composition. One of ordinary skill in the art, with the benefit of this disclosure, will recognize the appropriate amount of the amorphous silica to include for a chosen application.

Embodiments of the lost circulation compositions further may comprise a clay. In an embodiment, the clay may include a colloidal clay, nano clay, or a combination thereof which, for example, works synergistically with the other components in the lost circulation composition to achieve the desired properties. In an embodiment, the clay may comprise a synthetic clay. In an embodiment, the clay may comprise a synthetic nano-clay. Synthetic clays can be developed having properties similar to or better than naturally occurring clays, for example. Most clay minerals found naturally are in an unpure state with purification being potentially difficult and expensive. In addition, the natural supply of certain clay minerals may be limited. An example of a suitable synthetic clay is Thermavis™ additive, available from Halliburton Energy Services, Inc. The clay may be present in the lost circulation composition in an amount of about 0.1% to about 2% by weight of the composition, for example. In an embodiment, the clay may be present in an amount of about 0.5% to about 2% by weight of the composition. In an embodiment, the clay may be present in an amount of about 0.5% to about 1% by weight of the composition. One of ordinary skill in the art, with the benefit of this disclosure, will recognize the appropriate amount of the clay to include for a chosen application.

The water used in embodiments of the lost circulation compositions of the present invention may be freshwater or saltwater (e.g., water containing one or more salts dissolved therein, seawater, brines, saturated saltwater, etc.). In general, the water may be present in an amount sufficient to form a pumpable slurry. By way of example, the water may be present in the lost circulation compositions in an amount in the range of from about 50% to about 80% by weight of the lost circulation composition. In an embodiment, the water may be present in an amount of about 60% to about 75% by weight of the composition.

Embodiments of the lost circulation compositions may further comprise an acid-soluble filler. The acid-soluble filler may be used, for example, to provide an acid-soluble component so that the lost circulation compositions can be dissolved and removed. This may be desirable, for example, if the lost circulation composition is used in a producing zone. Examples of suitable acid-soluble fillers include dolomite, magnesium carbonate, calcium carbonate, and zinc carbonate. In an embodiment, the acid-soluble filler may include sub micron size filler having particle size in the range of 100 nm to 1 micron and, for example, between 200 nm to 800 nm. For example, sub micron-calcium carbonate may be used in accordance with embodiments of the present invention. In one embodiment, the calcium carbonate may have a particle size greater than 1 micron. Where used, the acid-soluble filler may present in the lost circulation compositions in an amount of from about 0.1% to about 300% by weight of the hydraulic cement. In an embodiment, the acid-soluble filler is present in an amount of from about 15% to about 50% by weight of the hydraulic cement. One of ordinary skill in the art, with the benefit of this disclosure, will recognize the appropriate amount of the acid-soluble filler to include for a chosen application.

Other additives suitable for use in subterranean cementing operations also may be added to embodiments of the lost circulation compositions, in accordance with embodiments of the present invention. Examples of such additives include, but are not limited to, strength-retrogression additives, set accelerators, set retarders, weighting agents, lightweight additives, gas-generating additives, mechanical property enhancing additives, lost-circulation materials, filtration-control additives, dispersants, a fluid loss control additive, defoaming agents, foaming agents, thixotropic additives, and combinations thereof. An example of a suitable fluid loss control additive is HALAD® 344 fluid loss additive, available from Halliburton Energy Services, Inc. Specific examples of these, and other, additives include crystalline silica, fumed silica, salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. By way of example, retarders may be included for high temperatures and heavy weight additives may be incorporated for high density composition. A person having ordinary skill in the art, with the benefit of this disclosure, will readily be able to determine the type and amount of additive useful for a particular application and desired result.

As previously mentioned, embodiments of the lost circulation compositions may rapidly develop static gel strength. For example, the lost circulation compositions may be characterized by a 10-second static gel strength of at least about 15 lbf/100 ft$^2$ at room temperature (e.g., about 78° F.). By way of further example, the lost circulation compositions may be characterized by a 10-minute static gel strength of at least about 25 lbf/100 ft$^2$ at room temperature.

In addition to static gel strength, embodiments of the lost circulation compositions should remain pumpable for an extended period of time. A fluid is considered to be in a pumpable fluid state where the fluid has a consistency of less than 70 Bc, as measured using an FANN Atmospheric Consistometer Model 165AT (available from FANN Instrument Company, Houston, Tex.) at room temperature. In an embodiment, the lost circulation composition should remain pumpable for at least about 1 day. Even further, the lost circulation compositions may remain pumpable at elevated temperatures. In another embodiment, the lost circulation compositions may remain pumpable for at least about 1 day at temperature up to about 193° F. In one embodiment, the lost circulation composition has a consistency of less than 35 Bc for at least about 1 day at a temperature up to about 193° F. at 150 rpm. In accordance with present embodiments, when the shear is removed, the composition should gel and, on the other hand, the composition should thin when re-sheared. In one embodiment, the lost circulation composition develops consistency of greater than 70 Bc when the stirring is stopped in a consistometer at room temperature. However, the composition thins to a consistency of less than about 35 Bc when the stirring is resumed at 150 rpm. In addition, the composition should develop gel strength rapidly when left static in certain embodiments. Gel strength development should be followed, for example, by rapid development of compressive strength when left static for longer time.

As will be appreciated by those of ordinary skill in the art, embodiments of the lost circulation compositions of the present invention may be used to control lost circulation. As previously mentioned, lost circulation zones are often encountered into which drill fluid circulation can be lost. As a result, drilling typically must be terminated with the implementation of remedial procedures, for example. In accordance with embodiments, the lost circulation compositions can be used to seal the lost circulation zones to prevent the uncontrolled flow of fluids into or out of the lost circulation zones, e.g., lost drilling fluid circulation, crossflows, underground blow-outs and the like. In an embodiment, a lost circulation composition is prepared. After preparation, the lost circulation composition is introduced into the lost circulation zone. In an embodiment, the lost circulation composition is pumped through one or more openings at the end of the string of drill pipe. For example, the lost circulation composition can be pumped through the drill bit. Once placed into the lost circulation zone, the lost circulation should set to form a hardened mass inside the lost circulation zone. This hardened mass should seal the zone and control the loss of subsequently pumped drilling fluid, which allows for continued drilling. In addition to drilling fluids, embodiments of the present invention may also be used to control lost circulation problems encountered with other fluids, for example, spacer fluids, completion fluids (e.g., completion brines), fracturing fluids, and cement compositions that may be placed into a well bore.

To facilitate a better understanding of the present technique, the following examples of some specific embodiments are given. In no way should the following examples be read to limit, or to define, the scope of the invention.

COMPARATIVE EXAMPLE

The following series of tests were performed to determine properties of a comparative lost circulation composition. The comparative lost circulation composition had a density of 10 ppg and comprised Class G Portland cement, synthetic clay (Thermavis, available from Halliburton Energy Services, Inc.), and water. Table 1 lists the components and amounts used to design the comparative lost circulation composition. The slurry was observed to be unstable with undesired settling and free water.

TABLE 1

| Component | Percent of Sample Weight |
| --- | --- |
| Class G Cement | 24.3 |
| Synthetic Clay | 0.8 |
| Water | 74.9 |

A static gel strength test was performed on the comparative lost circulation composition using a Fann Model 35 viscometer in accordance with API Recommended Practice 10B-2 (ISO 10426-2). The static gel strength test was conducted at room temperature and 190° F. The static gel strength was recorded at 10 seconds and 10 minutes. The results of the static gel strength tests are set forth in Table 2 below.

TABLE 2

| | Static Gel Strength (lbf/100 sq ft) | |
| --- | --- | --- |
| Time | Room Temperature | 190° F. |
| 10 sec | 5 | 9 |
| 10 min | 7 | 10 |

Additionally, the rheological properties of the sample lost circulation composition were also determined using a Fann Model 35 viscometer at the temperature indicated in the table below using a bob and sleeve and spring #1. The results of these tests are provided in the table below.

TABLE 3

| | Rheological Properties | |
| --- | --- | --- |
| RPM | Room Temperature | 190° F. |
| 3 | 3 | 4 |
| 6 | 4 | 6 |
| 30 | 5 | 8 |
| 60 | 7 | 10 |
| 100 | 9 | 12 |
| 200 | 10 | 15 |
| 300 | 14 | 16 |
| 600 | 25 | 20 |

EXAMPLE 1

The following series of tests were performed to determine properties of a lost circulation composition with a density of 10 ppg that comprised Class G Portland cement, synthetic clay, amorphous silica, a fluid loss control additive, nano-silica, and water. The synthetic clay in the sample was Thermavis with a particle size of 100 microns, available from Halliburton Energy Services, Inc. The amorphous silica in the sample was Silicalite™ cement additive, available from Halliburton Energy Services, Inc. The fluid loss control additive in the sample was HALAD® 344 fluid loss additive, available from Halliburton Energy Services, Inc. The nano-silica was a colloidal nano-silica with a particle size of 5 nm to 8 nm, available as Cemsyn LP from Bee Chems, India. Table 4 lists the components and amounts used to design the lost circulation composition.

TABLE 4

| Component | Percent of Sample Weight |
|---|---|
| Class G Cement | 16.6 |
| Synthetic Clay | 0.8 |
| Amorphous Silica | 8.3 |
| Fluid Loss Control Additive | 0.2 |
| Nano-Silica | 2.4 |
| Water | 71.6 |

A static gel strength test was performed on the lost circulation composition using a Fann Model 35 viscometer in accordance with API Recommended Practice 10B-2 (ISO 10426-2), "Recommended Practices for Testing Well Cement." The static gel strength test was conducted at room temperature and 190° F. The static gel strength was recorded at 10 seconds and 10 minutes. The results of the static gel strength tests are set forth in Table 5 below. As illustrated in the table below, the static gel strength test shows that the sample composition rapidly developed gel strength.

TABLE 5

| | Static Gel Strength (lbf/100 sq ft) | |
|---|---|---|
| Time | Room Temperature | 190° F. |
| 10 sec | 26 | 25 |
| 10 min | 45 | 140 |

The rheological properties of the sample lost circulation composition were also determined using a Fann Model 35 viscometer at the temperature indicated in the table below using a bob and sleeve and spring #1. The results of these tests are provided in the table below. The rheology profile in the table below shows a flat rheology profile on shearing at the different rotational speeds.

TABLE 6

| | Rheological Properties | |
|---|---|---|
| RPM | Room Temperature | 190° F. |
| 3 | 16 | 18 |
| 6 | 22 | 20 |
| 30 | 50 | 32 |
| 60 | 51 | 34 |
| 100 | 52 | 36 |
| 200 | 54 | 37 |
| 300 | 55 | 40 |
| 600 | 56 | 47 |

Figure 1:
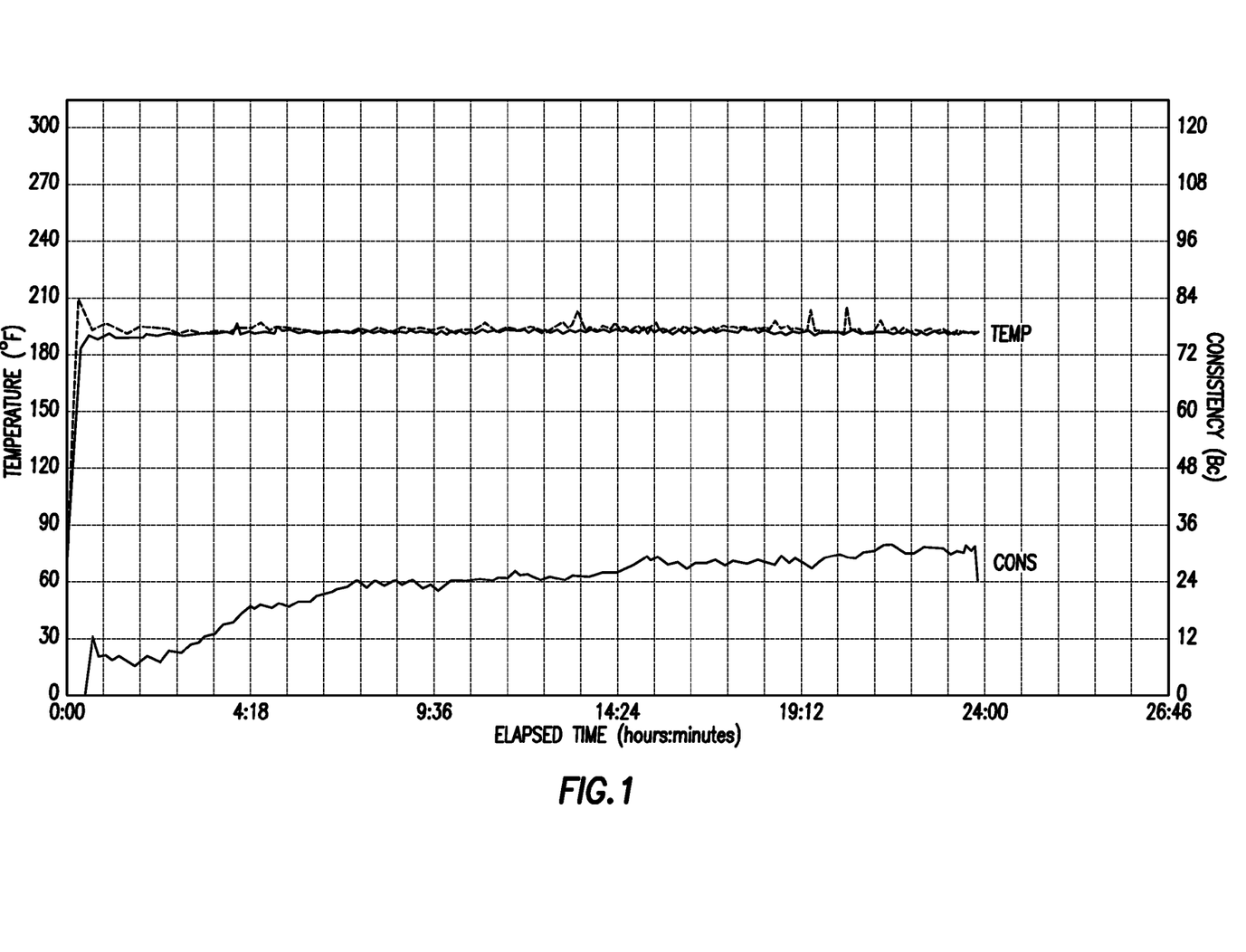
FIG. 1 is a graph of a thickening time test.

The thickening times of the sample lost circulation composition were then determined using a consistometer in accordance with API RP 10B, "Recommended Practices for Testing Oil-Well Cements and Cement Additives." The test was performed at 193° F. and a constant pressure of 5,800 psi. The time to test temperature was 18 minutes. The results of this test are shown in FIG. 1. A fluid is considered "non-pumpable" once it exceeds 70 Bc. As illustrated in FIG. 1, the sample lost circulation composition remained pumpable throughout the test with the composition having a viscosity of 30 Bc even after 24 hours at 193° F.

Figure 2:
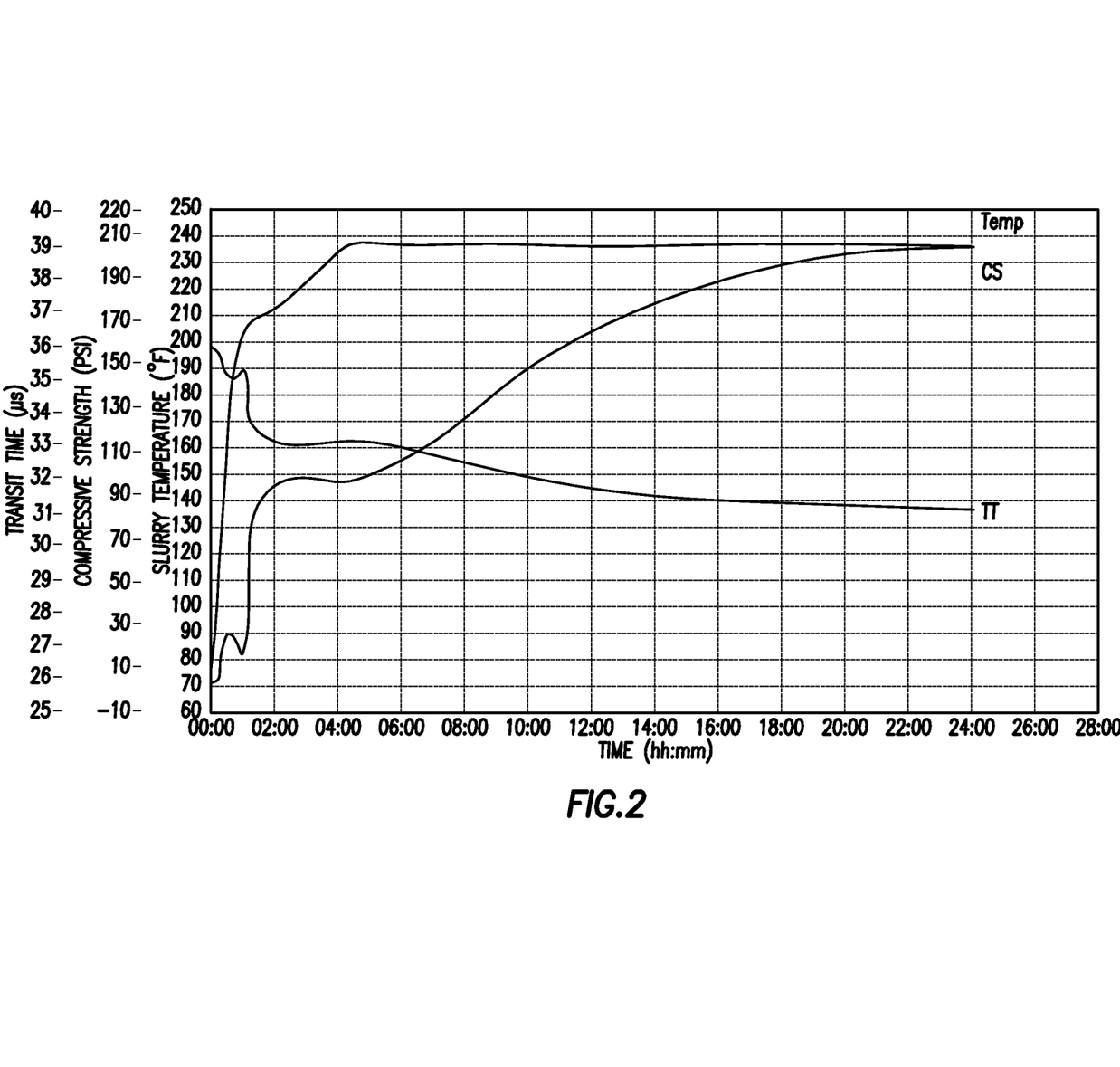
FIGS. 2-3 are graphs of compressive strength tests.
Figure 3:
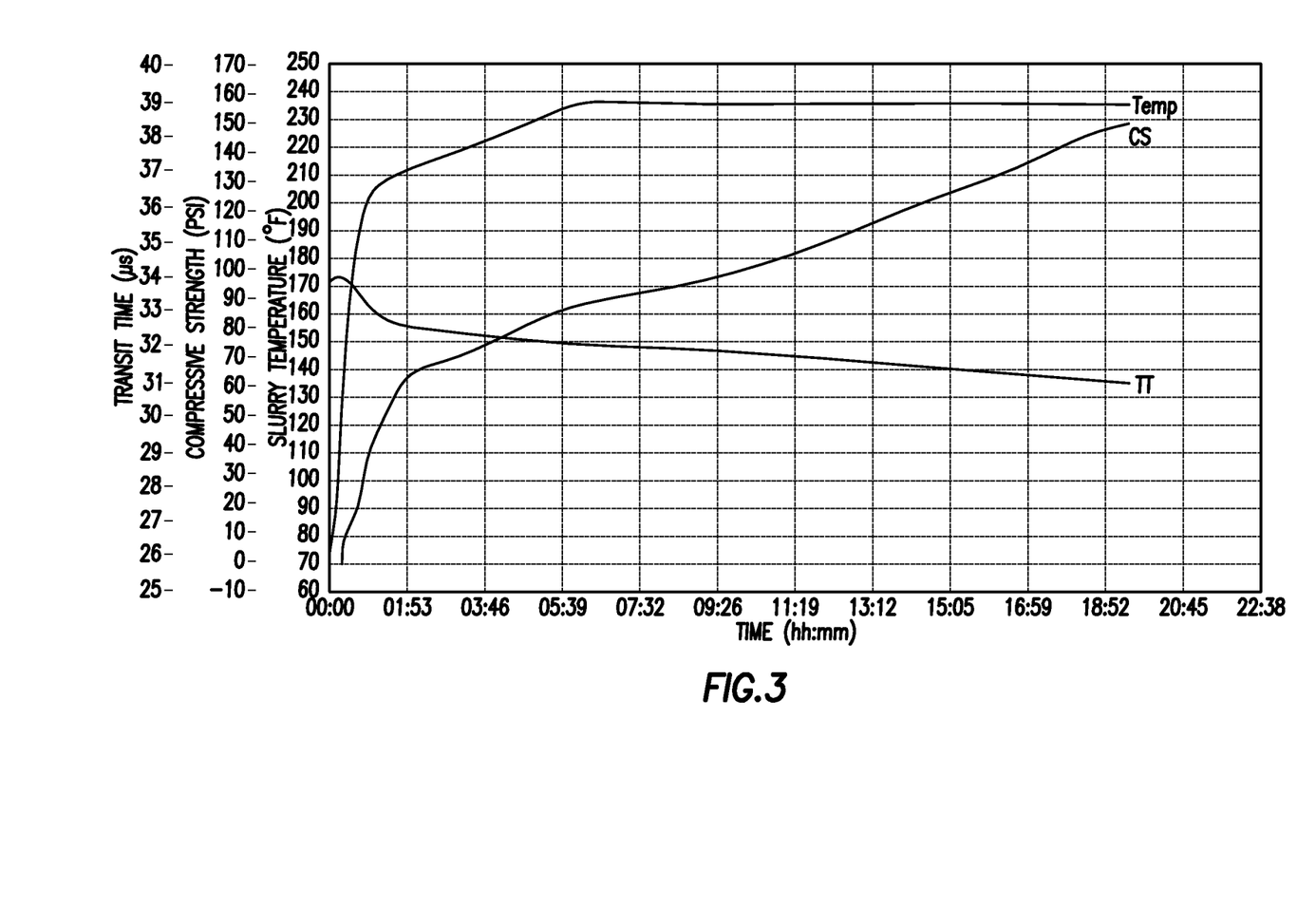

The compressive strengths of the sample lost circulation composition were then determined using an ultrasonic cement analyzer in accordance with API RP 10B, "Recommended Practices for Testing Oil-Well Cements and Cement Additives." The test was performed at a temperature of 237° F. A first test was performed in which the sample composition was not conditioned. FIG. 2 is a graph of the results of the first test. A second test was performed with the sample composition first conditioned in an atmospheric consistometer for 2:30 hours at 155° F. FIG. 3 is a graph of the results of the second test. As illustrated in FIGS. 2 and 3, the sample lost circulation composition rapidly developed compressive strength upon setting, reaching 50 psi in about 1 hour.

EXAMPLE 2

The following series of tests were performed to determine properties of a lost circulation composition with a density of 10 ppg that comprised Class G Portland cement, synthetic clay, amorphous silica, a fluid loss control additive, nano-silica, sub micron size-calcium carbonate, and water. The synthetic clay in the sample was Thermavis with a particle size of 100 microns, available from Halliburton Energy Services, Inc. The amorphous silica in the sample was Silicalite™ cement additive, available from Halliburton Energy Services, Inc. The fluid loss control additive in the sample was HALAD® 344 fluid loss additive, available from Halliburton Energy Services, Inc. The nano-silica was a colloidal nano-silica with a particle size of 5 nm to 8 nm, available as Cemsyn LP from Bee Chems, India. The sub micron sized calcium carbonate was a dispersion with a particle size in the range of 200 nm to 800 nm, available from Revertex-KA Latex (India) Pvt. Ltd. Table 7 lists the components and amounts used to design the lost circulation composition.

TABLE 7

| Component | Percent of Sample Weight |
|---|---|
| Class G Cement | 14.0 |
| Synthetic Clay | 0.8 |
| Amorphous Silica | 8.4 |
| Fluid Loss Control Additive | 0.2 |
| Nano-Silica | 2.5 |
| Nano-Calcium Carbonate | 3.6 |
| Water | 70.5 |

A static gel strength test was performed on the lost circulation composition using a Fann Model 35 viscometer in accordance with API Recommended Practice 10B-2 (ISO 10426-2), "Recommended Practices for testing Well Cement". The static gel strength test was conducted at room temperature and 190° F. The static gel strength was recorded at 10 seconds and 10 minutes. The results of the static gel strength tests are set forth in Table 8 below. As illustrated in the table below, the static gel strength test shows that the sample composition rapidly developed gel strength.

TABLE 8

| | Static Gel Strength (lbf/100 sq ft) | |
|---|---|---|
| Time | Room Temperature | 190° F. |
| 10 sec | 21 | 29 |
| 10 min | 29 | 122 |

The rheological properties of the sample lost circulation composition were also determined using a Fann Model 35 viscometer at the temperature indicated in the table below using a bob and sleeve and spring #1. The results of these tests are provided in the table below. The rheology profile in the table below shows a flat rheology profile on shearing at the different rotational speeds.

TABLE 9

| | Rheological Properties | |
| --- | --- | --- |
| RPM | Room Temperature | 190° F. |
| 3 | 17 | 25 |
| 6 | 24 | 27 |
| 30 | 46 | 45 |
| 60 | 48 | 46 |
| 100 | 52 | 47 |
| 200 | 55 | 48 |
| 300 | 58 | 51 |
| 600 | 59 | 55 |

Figure 4:
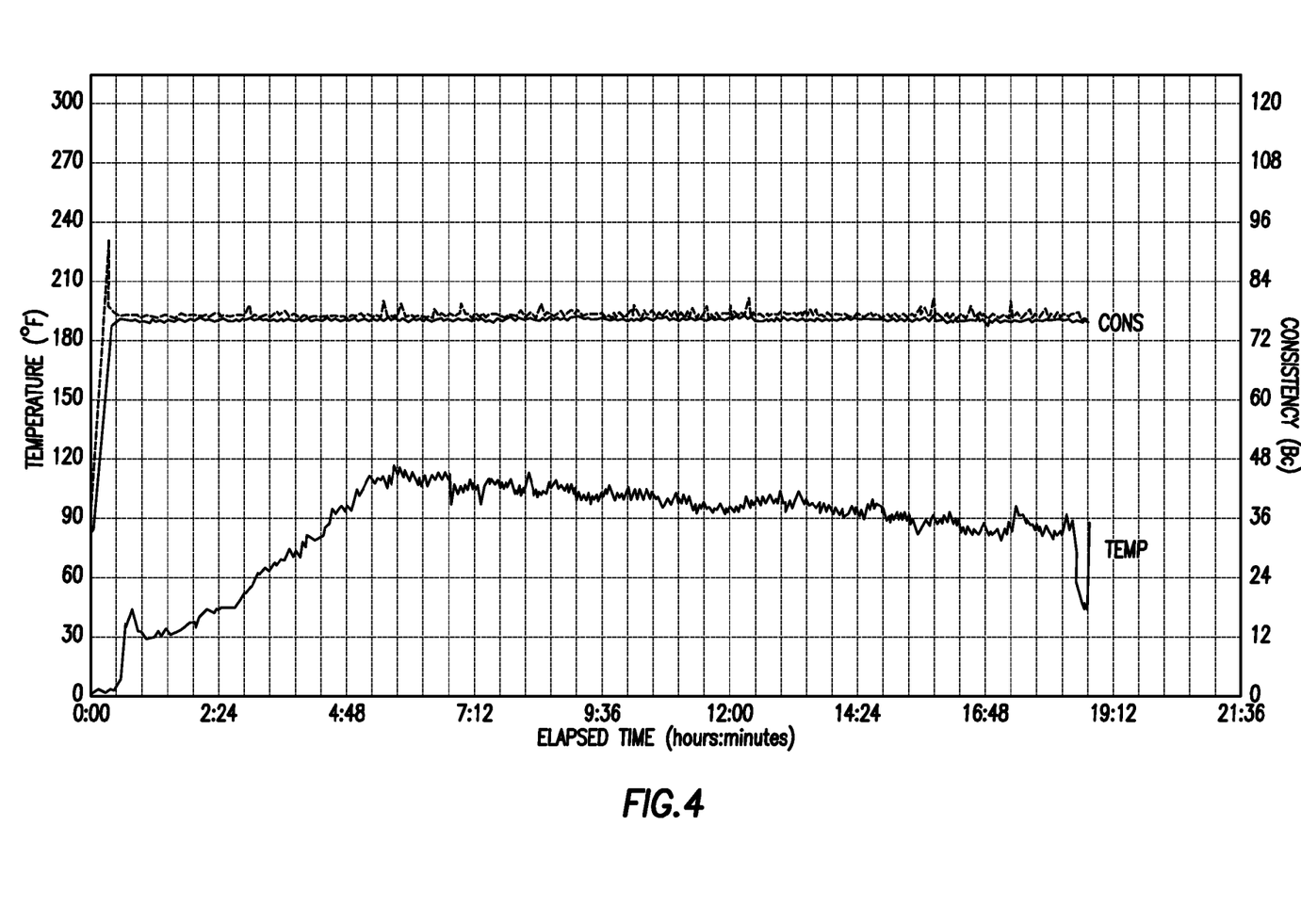
FIG. 4 is a graph of a thickening time test.

The thickening times of the sample lost circulation composition were then determined using a consistometer in accordance with API RP 10B, "Recommended Practices for Testing Oil-Well Cements and Cement Additives." The test was performed at 193° F. and a constant pressure of 5,800 psi. The time to test temperature was 18 minutes. The results of this test are shown in FIG. 4. A fluid is considered "non-pumpable" once it exceeds 70 Bc. As illustrated in FIG. 4, the sample lost circulation composition remained pumpable throughout the test with the composition having a viscosity of less than 50 Bc even after 18 hours at 193° F.

Figure 5:
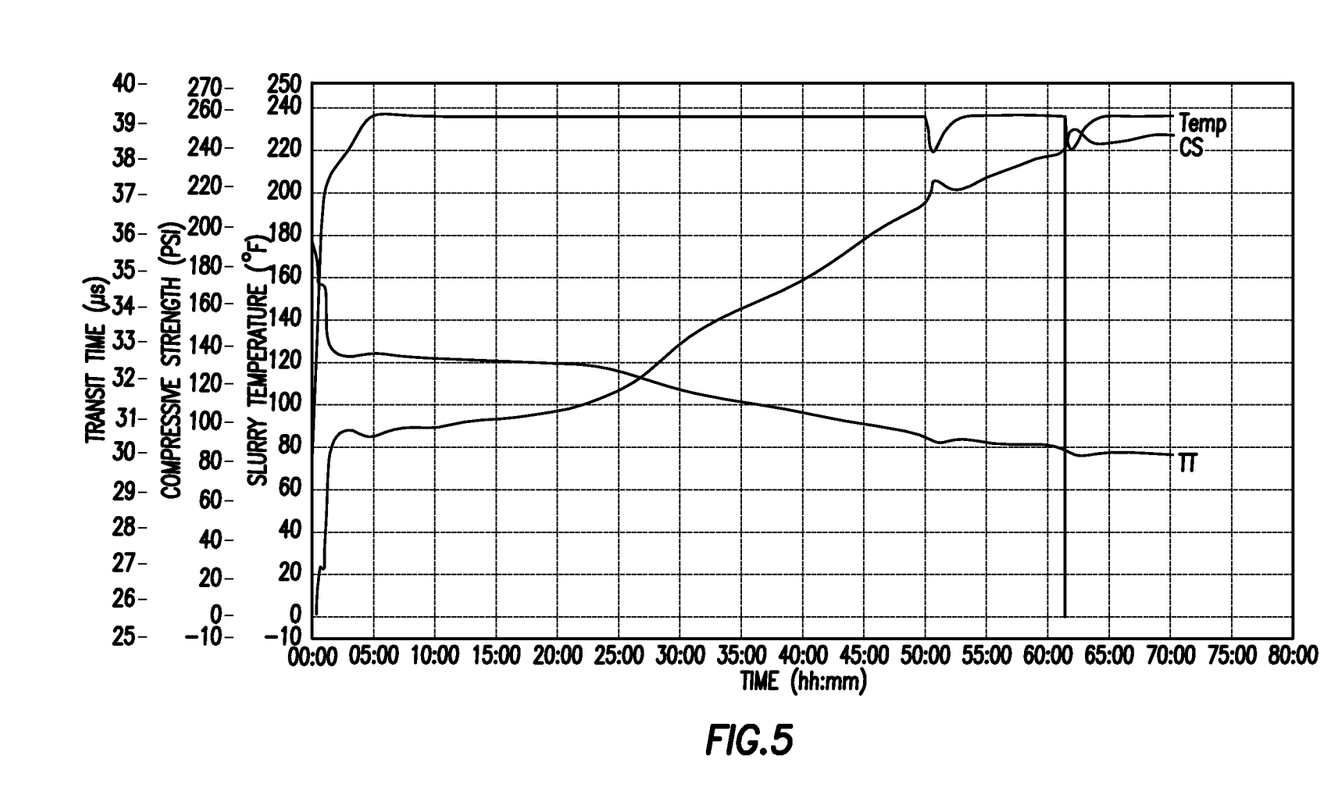
FIG. 5 is a graph of a compressive strength test.

The compressive strengths of the sample lost circulation composition were then determined using an ultrasonic cement analyzer in accordance with API RP 10B, "Recommended Practices for Testing Oil-Well Cements and Cement Additives." The test was performed at a temperature of 237° F. The results of this test are shown in FIG. 5. As illustrated in FIG. 5, the sample lost circulation composition rapidly developed compressive strength upon setting, reaching 50 psi in about 1 hour.

An on/off test was also performed on the sample lost circulation composition. The test was conducted by placing the sample composition in a HPHT consistometer. The sample was stirred for 2 hours at 150 rpm, allowed to remain static for 15 minutes, and then stirred for 2 hours at 150 rpm. This cycle was performed three times. The test was performed at 193° F. and 5,800 psi. The time to test temperature was 18 minutes. The sample was observed to gel while static but returned to liquid upon application of shear.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

It should be understood that the compositions and methods are described in terms of "comprising," "containing," or "including" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention.

What is claimed is:

1. A lost circulation composition comprising:
hydraulic cement in an amount of about 0.1% to about 25% by weight of the lost circulation composition;
nano-particles having a particle size in a range from about 1 nanometer to about 100 nanometers and present in an amount of about 0.1% to about 10% by weight of the lost circulation composition, wherein the nano-particles comprise nano-particles selected from the group consisting of colloidal nano-silica, nano-alumina, nano-zinc oxide, nano-boron, nano-iron oxide, nano-calcium carbonate, and any combination thereof;
amorphous silica in an amount of about 0.1% to about 15% by weight of the lost circulation composition;
a nano-clay having a particle size in a range of from about 1 nanometer to about 100 nanometers and present in an amount of about 0.1% to about 2% by weight of the lost circulation composition; and
water in an amount of about 60% to about 80% by weight of the lost circulation composition;
wherein the lost circulation composition has a 10-second static gel strength of at least about 15 lbf/100 ft$^2$ at room temperature,
wherein the lost circulation composition has a 10-minute static gel strength of at least about 25 lbf/100 ft$^2$ at room temperature,
wherein the lost circulation composition is a sealing composition that prevents the migration of fluids.

2. The lost circulation composition of claim 1 wherein the lost circulation composition has a consistency of less than 35 Bc at a temperature up to about 193° when under shear at 150 rpm, develops a consistency of greater than 70 Bc when the shear is stopped, and then thins to a consistency of less than 35 BC at a temperature up to about 193° F. when shear is re-applied at 150 rpm.

3. The lost circulation composition of claim 1 wherein the lost circulation composition has a density of about 6 pounds per gallon to about 14 pounds per gallon.

4. The lost circulation composition of claim 1 wherein the hydraulic cement comprises at least one hydraulic cement selected from the group consisting of a Portland cement, a pozzolana cement, a gypsum cement, a high-alumina-content cement, a slag cement, and any combination thereof.

5. The lost circulation composition of claim 1 wherein the nano-particles have a particle size of about 5 nanometers to about 50 nanometers.

6. The lost circulation composition of claim 1 wherein the nano-particles comprise the colloidal nano-silica.

7. The lost circulation composition of claim 1 wherein the nano-clay comprises a synthetic nano-clay.

8. The lost circulation composition of claim 1 wherein the nano-clay comprises a synthetic nano-clay, and wherein the nano-particles comprise the colloidal nano-silica.

9. The lost circulation composition of claim 1 wherein the lost circulation composition further comprises sub-micron sized calcium carbonate.

10. The lost circulation composition of claim 1 wherein the lost circulation composition further comprises at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, a thixotropic additive, and any combination thereof.

11. The lost circulation composition of claim 1 wherein the lost circulation composition further comprises at least one additive selected from the group consisting of crystalline silica, fumed silica, salt, fiber, hydratable clay, calcined shale, vitrified shale, microsphere, fly ash, slag, diatomaceous earth, metakaolin, rice husk ash, natural pozzolan, zeolite, cement kiln dust, lime, elastomer, resin, latex, and any combination thereof.

12. A lost circulation composition comprising:
hydraulic cement in an amount of about 0.1% to about 25% by weight of the lost circulation composition;
nano-particles having a particle size in a range of from about 1 nanometer to about 100 nanometers and present in an amount of about 0.1% to about 10% by weight of the lost circulation composition, wherein the nano-particles comprise nano-particles selected from the group consisting of colloidal nano-silica, nano-alumina, nano-zinc oxide, nano-boron, nano-iron oxide, nano-calcium carbonate, and any combination thereof;
amorphous silica in an amount of about 0.1% to about 15% by weight of the lost circulation composition;
a nano-clay having a particle size in a range of from about 1 nanometer to about 100 nanometers and present in an amount of about 0.1% to about 2% by weight of the lost circulation composition; and
water in an amount of about 60% to about 80% by weight of the lost circulation composition;
wherein the lost circulation composition has a density of about 6 pounds per gallon to about 14 pounds per gallon,
wherein the lost circulation composition has a 10-second static gel strength of at least about 15 lbf/100 ft$^2$ at room temperature,
wherein the lost circulation composition has a 10-minute static gel strength of at least about 25 lbf/100 ft$^2$ at room temperature,
wherein the lost circulation composition is a sealing composition that prevents the migration of fluids.

13. The lost circulation composition of claim 12 wherein the lost circulation composition has a consistency of less than 35 Bc at a temperature up to about 193° when under shear at 150 rpm, develops a consistency of greater than 70 Bc when the shear is stopped, and then thins to a consistency of less than 35 BC at a temperature up to about 193° F. when shear is re-applied at 150 rpm.

14. The lost circulation composition of claim 12 wherein the hydraulic cement comprises at least one hydraulic cement selected from the group consisting of a Portland cement, a pozzolana cement, a gypsum cement, a high-alumina-content cement, a slag cement, and any combination thereof.

15. The lost circulation composition of claim 12 wherein the nano-particles have a particle size of about 5 nanometers to about 50 nanometers.

16. The lost circulation composition of claim 12 wherein the nano-particles comprise the colloidal nano-silica.

17. The lost circulation composition of claim 12 wherein the nano-clay comprises a synthetic nano-clay.

18. The lost circulation composition of claim 12 wherein the lost circulation composition further comprises sub-micron sized calcium carbonate.

19. The lost circulation composition of claim 12 wherein the lost circulation composition further comprises at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, a thixotropic additive, and any combination thereof.

20. The lost circulation composition of claim 12 wherein the lost circulation composition further comprises at least one additive selected from the group consisting of crystalline silica, fumed silica, salt, fiber, hydratable clay, calcined shale, vitrified shale, microsphere, fly ash, slag, diatomaceous earth, metakaolin, rice husk ash, natural pozzolan, zeolite, cement kiln dust, lime, elastomer, resin, latex, and any combination thereof.

21. A lost circulation composition comprising:
Portland cement in an amount of about 10% to about 20% by weight of the lost circulation composition;
colloidal nano-silica in an amount of about 0.5% to about 4% by weight of the lost circulation composition, the colloidal nano-silica having a particle size of about 1 nanometer to about 100 nanometers;
amorphous silica in an amount of about 5% to about 10% by weight of the lost circulation composition;
synthetic nano-clay in an amount of about 0.5% to about 2% by weight of the lost circulation composition; and
water in an amount of about 60% to about 75% by weight of the lost circulation composition,
wherein the lost circulation composition has a 10-second static gel strength of at least about 15 lbf/100 ft$^2$ at room temperature,
wherein the lost circulation composition has a 10-minute static gel strength of at least about 25 lbf/100 ft$^2$ at room temperature,
wherein the lost circulation composition is a sealing composition that prevents the migration of fluids.

22. The lost circulation composition of claim 21 wherein the lost circulation composition has a consistency of less than 35 Bc at a temperature up to about 193° when under shear at 150 rpm, develops a consistency of greater than 70 Bc when the shear is stopped, and then thins to a consistency of less than 35 BC at a temperature up to about 193° F. when shear is re-applied at 150 rpm.

23. The lost circulation composition of claim 21 wherein the lost circulation composition further comprises sub-micron sized calcium carbonate.

24. The lost circulation composition of claim 21 wherein the lost circulation composition further comprises at least one additive selected from the group consisting of a strength-retrogression additive, a set accelerator, a set retarder, a weighting agent, a lightweight additive, a gas-generating additive, a mechanical property enhancing additive, a lost-circulation material, a filtration-control additive, a dispersant, a fluid loss control additive, a defoaming agent, a foaming agent, a thixotropic additive, and any combination thereof.

25. The lost circulation composition of claim 21 wherein the lost circulation composition further comprises at least one additive selected from the group consisting of crystalline silica, fumed silica, salt, fiber, hydratable clay, calcined shale, vitrified shale, microsphere, fly ash, slag, diatomaceous earth, metakaolin, rice husk ash, natural pozzolan, zeolite, cement kiln dust, lime, elastomer, resin, latex, and any combination thereof.

26. The lost circulation composition of claim 21 wherein the lost circulation composition has a density of about 6 pounds per gallon to about 14 pounds per gallon.

27. The lost circulation composition of claim 21 wherein the lost circulation composition comprises sub-micron sized calcium carbonate in an amount of about 15% to about 50% by weight of the hydraulic cement.

* * * * *